United States Patent
Liao et al.

(10) Patent No.: US 11,841,484 B2
(45) Date of Patent: Dec. 12, 2023

(54) OPTICAL IMAGING LENS

(71) Applicant: GENIUS ELECTRONIC OPTICAL (XIAMEN) CO., LTD., Fujian (CN)

(72) Inventors: Huabin Liao, Fujian (CN); Xue Li, Fujian (CN); Jiayuan Zhang, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 187 days.

(21) Appl. No.: 17/151,675

(22) Filed: Jan. 19, 2021

(65) Prior Publication Data

US 2021/0208370 A1    Jul. 8, 2021

Related U.S. Application Data

(63) Continuation of application No. 16/015,212, filed on Jun. 22, 2018, now Pat. No. 10,935,762.

(30) Foreign Application Priority Data

Mar. 30, 2018    (CN) .......................... 201810293874.9

(51) Int. Cl.
*G02B 13/00* (2006.01)
*G02B 9/62* (2006.01)

(52) U.S. Cl.
CPC ........... *G02B 13/0045* (2013.01); *G02B 9/62* (2013.01)

(58) Field of Classification Search
CPC ... G02B 9/62; G02B 13/0045; G02B 13/0005
USPC ........................................ 359/713, 752, 756
See application file for complete search history.

(56) References Cited

U.S. PATENT DOCUMENTS

| 2014/0347745 | A1* | 11/2014 | Shinohara | .......... G02B 13/0045 |
| | | | | 359/713 |
| 2015/0070784 | A1* | 3/2015 | Chen | .................. G02B 13/0045 |
| | | | | 359/713 |
| 2015/0207998 | A1* | 7/2015 | Lin | ..................... H04N 5/23296 |
| | | | | 359/713 |

(Continued)

FOREIGN PATENT DOCUMENTS

| TW | I607238 | 12/2017 |
| TW | I616700 | 3/2018 |

OTHER PUBLICATIONS

"Office Action of Taiwan Counterpart Application", dated Dec. 6, 2021, p. 1-p. 11.

*Primary Examiner* — Christopher Stanford
*Assistant Examiner* — Journey F Sumlar
(74) *Attorney, Agent, or Firm* — JCIPRNET

(57) ABSTRACT

An optical imaging lens includes a first lens element, a second lens element, a third lens element, a fourth lens element, a fifth lens element, and a sixth lens element from an object side to an image side in order along an optical axis. The first lens element to the sixth lens element each include an object-side surface facing the object side and allowing imaging rays to pass through and an image-side surface facing the image side and allowing the imaging rays to pass through. The optical imaging lens satisfies: EFL/(T1+T3) ≥2.300. EFL is an effective focal length of the optical imaging lens. T1 is a thickness of the first lens element along the optical axis. T3 is a thickness of the third lens element along the optical axis.

18 Claims, 27 Drawing Sheets

(56) References Cited

U.S. PATENT DOCUMENTS

| | | | |
|---|---|---|---|
| 2016/0161719 A1* | 6/2016 | Son | G02B 9/62 |
| | | | 359/713 |
| 2017/0059828 A1 | 3/2017 | Sekine et al. | |
| 2017/0322391 A1 | 11/2017 | Kang et al. | |
| 2017/0336604 A1* | 11/2017 | Hsu | G02B 13/0045 |
| 2018/0136443 A1* | 5/2018 | Yin | G02B 13/0045 |

* cited by examiner

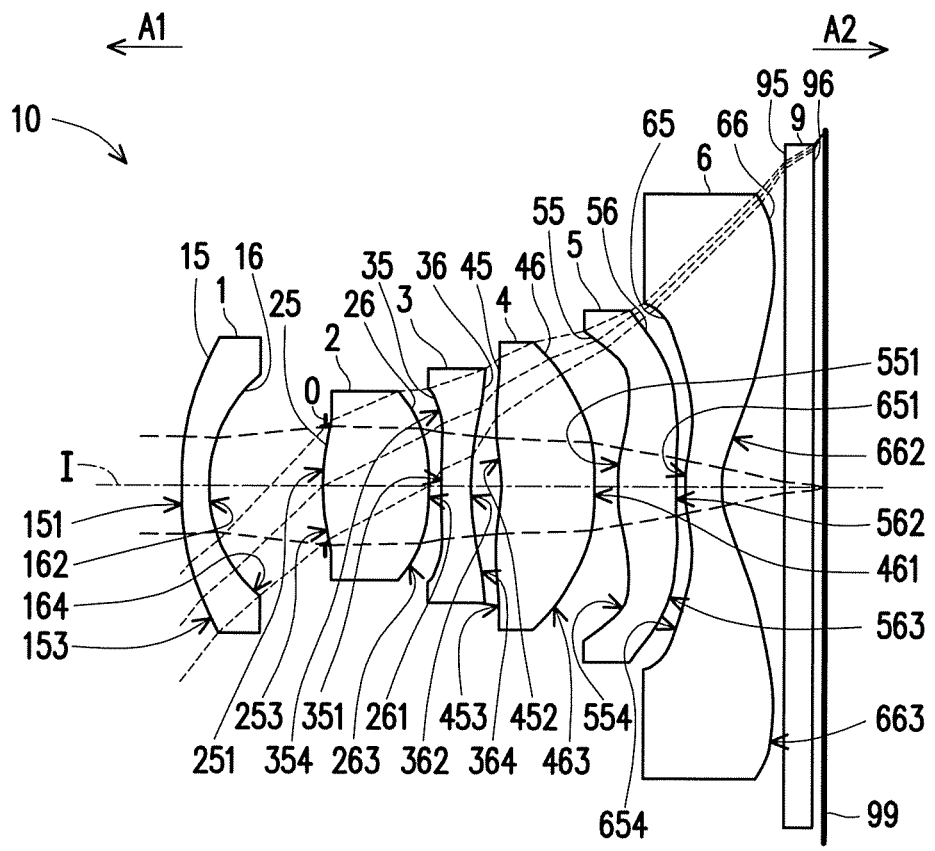
FIG. 6
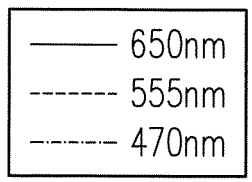
——— 650nm
------- 555nm
—··—·· 470nm
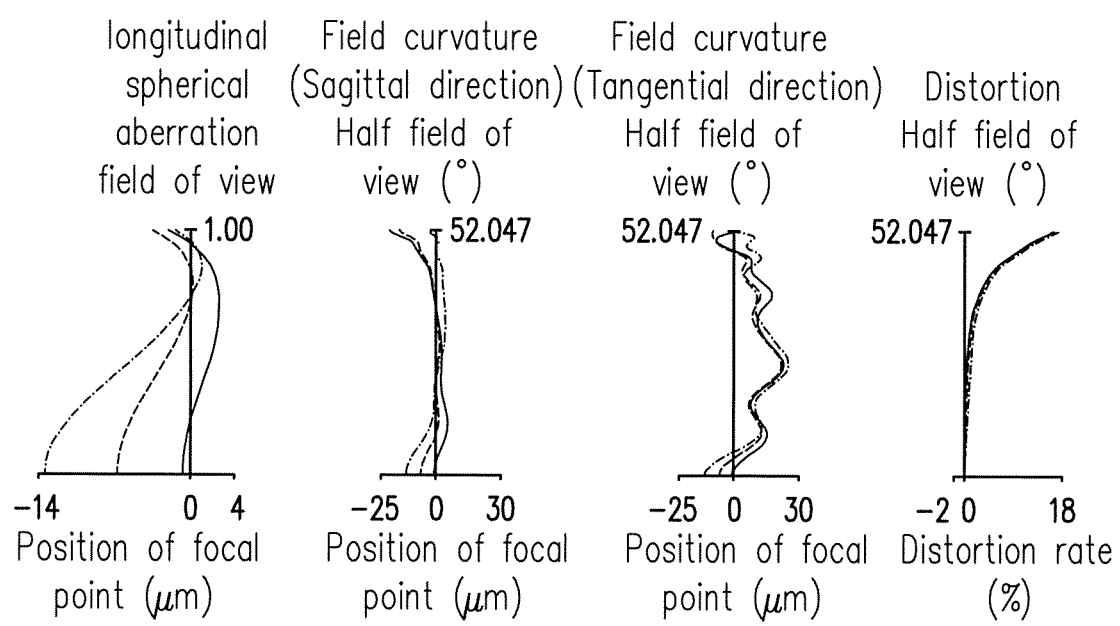
FIG. 7A  FIG. 7B  FIG. 7C  FIG. 7D

| First embodiment |||||||
|---|---|---|---|---|---|---|
| Effective focal length=1.679 mm, Half field of view=52.047°, F-number=2.4, System length=4.533 mm, Image height=2.520 mm |||||||
| Element | Surface | Radius (mm) | Thickness (mm) | Refractive index | Abbe Number | Focal length (mm) |
| Object | | Infinity | Infinity | | | |
| First lens element 1 | Object-side surface 15 | 3.213 | 0.200 | 1.545 | 55.987 | -3.948 |
| | Image-side surface 16 | 1.262 | 0.807 | | | |
| Aperture 0 | | Infinity | -0.007 | | | |
| Second lens element 2 | Object-side surface 25 | 1.710 | 0.746 | 1.535 | 55.635 | 1.716 |
| | Image-side surface 26 | -1.690 | 0.083 | | | |
| Third lens element 3 | Object-side surface 35 | 2.966 | 0.208 | 1.642 | 22.409 | -4.505 |
| | Image-side surface 36 | 1.430 | 0.198 | | | |
| Fourth lens element 4 | Object-side surface 45 | -9.298 | 0.677 | 1.535 | 55.635 | 6.996 |
| | Image-side surface 46 | -2.741 | 0.166 | | | |
| Fifth lens element 5 | Object-side surface 55 | 1.006 | 0.409 | 1.545 | 55.987 | 2.910 |
| | Image-side surface 56 | 2.345 | 0.066 | | | |
| Sixth lens element 6 | Object-side surface 65 | 1.070 | 0.255 | 1.642 | 22.409 | -2.990 |
| | Image-side surface 66 | 0.625 | 0.431 | | | |
| Filter 9 | Object-side surface 95 | Infinity | 0.210 | | | |
| | Image-side surface 96 | Infinity | 0.083 | | | |
| | Image plane 99 | Infinity | | | | |

FIG. 8

| Surface | K | $a_2$ | $a_4$ | $a_6$ | $a_8$ |
|---|---|---|---|---|---|
| 15 | 2.650823E+00 | 0.000000E+00 | 2.343791E-01 | -2.425673E-01 | 1.035928E-01 |
| 16 | -1.247555E+00 | 0.000000E+00 | 4.531098E-01 | -2.510065E-01 | 0.000000E+00 |
| 25 | 1.086059E+00 | 0.000000E+00 | -6.860763E-02 | -4.688156E-01 | 3.027238E+00 |
| 26 | 3.573782E+00 | 0.000000E+00 | -6.679019E-01 | 3.642529E+00 | -1.252093E+01 |
| 35 | 1.513680E-01 | 0.000000E+00 | -1.383688E+00 | 3.885359E+00 | -9.165136E+00 |
| 36 | 5.092638E-01 | 0.000000E+00 | -7.815964E-01 | 1.451391E+00 | -1.909502E+00 |
| 45 | 8.478751E+01 | 0.000000E+00 | 2.478427E-01 | -3.105919E-01 | 6.069412E-02 |
| 46 | -6.099491E+00 | 0.000000E+00 | -1.265243E+00 | 4.741450E+00 | -1.153614E+01 |
| 55 | -5.088097E+00 | 0.000000E+00 | -1.105801E+00 | 3.122795E+00 | -5.643128E+00 |
| 56 | 1.551783E+00 | 0.000000E+00 | -1.406128E+00 | 3.159683E+00 | -3.937960E+00 |
| 65 | -6.640436E-01 | 0.000000E+00 | -1.722793E+00 | 2.923357E+00 | -4.053734E+00 |
| 66 | -2.855691E+00 | 0.000000E+00 | -5.241572E-01 | 5.983767E-01 | -3.769555E-01 |
| Surface | $a_{10}$ | $a_{12}$ | $a_{14}$ | $a_{16}$ | |
| 15 | -2.908669E-02 | 4.116828E-03 | 0.000000E+00 | 0.000000E+00 | |
| 16 | 0.000000E+00 | 0.000000E+00 | 0.000000E+00 | 0.000000E+00 | |
| 25 | -2.102194E+01 | 6.455893E+01 | -8.968906E+01 | 0.000000E+00 | |
| 26 | 2.189365E+01 | -1.917333E+01 | 5.764962E+00 | 0.000000E+00 | |
| 35 | 1.055358E+01 | -7.573730E+00 | 4.407432E+00 | 0.000000E+00 | |
| 36 | 8.497692E-02 | 2.997158E+00 | -3.235021E+00 | 1.105467E+00 | |
| 45 | 5.879018E-01 | -1.337086E+00 | 1.385495E+00 | -5.406309E-01 | |
| 46 | 1.744976E+01 | -1.628808E+01 | 8.551433E+00 | -1.912476E+00 | |
| 55 | 6.494355E+00 | -5.865301E+00 | 3.369647E+00 | -7.922571E-01 | |
| 56 | 1.946733E+00 | 3.241407E-01 | -6.538052E-01 | 1.719439E-01 | |
| 65 | 4.258509E+00 | -2.898969E+00 | 1.096825E+00 | -1.757325E-01 | |
| 66 | 1.403205E-01 | -3.083737E-02 | 3.694073E-03 | -1.861116E-04 | |

FIG. 9

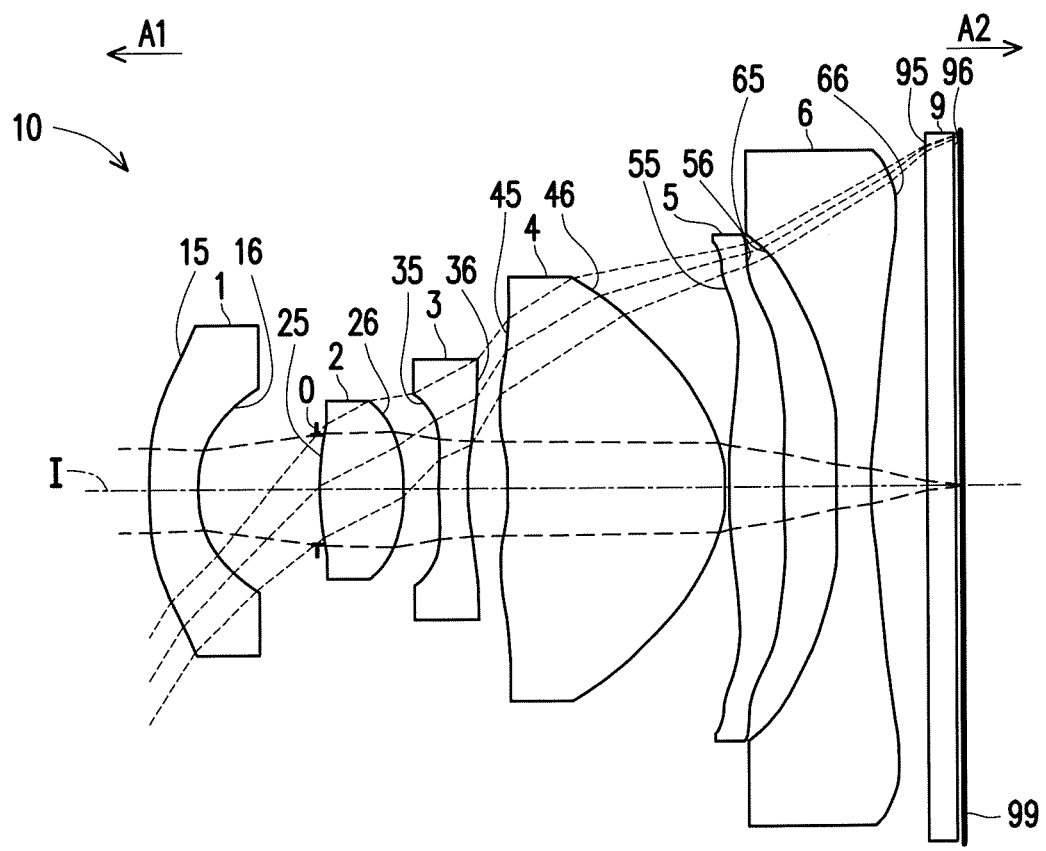
FIG. 10
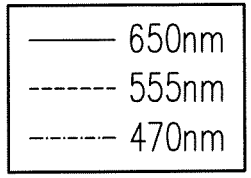
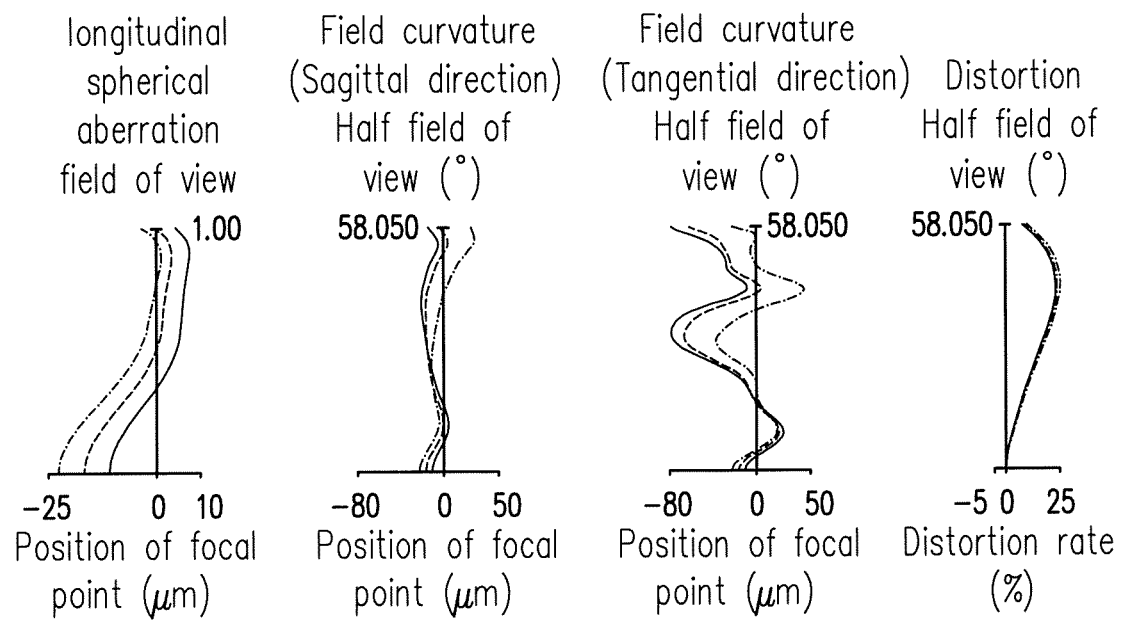
FIG. 11A    FIG. 11B    FIG. 11C    FIG. 11D

| Second embodiment | | | | | | |
|---|---|---|---|---|---|---|
| Effective focal length=1.442 mm, Half field of view=58.050°, F-number=2.4, System length=5.753 mm, Image height=2.520 mm | | | | | | |
| Element | Surface | Radius (mm) | Thickness (mm) | Refractive index | Abbe Number | Focal length (mm) |
| Object | | Infinity | Infinity | | | |
| First lens element 1 | Object-side surface 15 | 2.916 | 0.344 | 1.545 | 55.987 | -2.516 |
| | Image-side surface 16 | 0.895 | 0.842 | | | |
| Aperture 0 | | Infinity | 0.023 | | | |
| Second lens element 2 | Object-side surface 25 | 2.008 | 0.591 | 1.535 | 55.635 | 1.673 |
| | Image-side surface 26 | -1.456 | 0.254 | | | |
| Third lens element 3 | Object-side surface 35 | 3.442 | 0.200 | 1.642 | 22.409 | -3.654 |
| | Image-side surface 36 | 1.370 | 0.253 | | | |
| Fourth lens element 4 | Object-side surface 45 | -19.530 | 1.572 | 1.535 | 55.635 | 1.865 |
| | Image-side surface 46 | -0.978 | 0.025 | | | |
| Fifth lens element 5 | Object-side surface 55 | 2.615 | 0.383 | 1.545 | 55.987 | 34.742 |
| | Image-side surface 56 | 2.875 | 0.376 | | | |
| Sixth lens element 6 | Object-side surface 65 | 3.024 | 0.246 | 1.642 | 22.409 | -11.592 |
| | Image-side surface 66 | 2.086 | 0.393 | | | |
| Filter 9 | Object-side surface 95 | Infinity | 0.210 | | | |
| | Image-side surface 96 | Infinity | 0.040 | | | |
| | Image plane 99 | Infinity | | | | |

FIG. 12

| Surface | K | $a_2$ | $a_4$ | $a_6$ | $a_8$ |
|---|---|---|---|---|---|
| 15 | 2.819098E+00 | 0.000000E+00 | 2.322329E-01 | -2.472091E-01 | 1.006091E-01 |
| 16 | -2.281232E+00 | 0.000000E+00 | 8.042967E-01 | -2.637456E-01 | 0.000000E+00 |
| 25 | -1.645746E+00 | 0.000000E+00 | -7.905916E-02 | -2.152588E-01 | -1.079933E+00 |
| 26 | 3.336206E+00 | 0.000000E+00 | -3.665897E-01 | 4.967235E-01 | 1.940992E-01 |
| 35 | 4.053296E+00 | 0.000000E+00 | -1.407880E+00 | 2.013571E+00 | -9.624489E+00 |
| 36 | 3.976472E-01 | 0.000000E+00 | -8.735878E-01 | 7.136775E-01 | 7.128950E-01 |
| 45 | 1.505392E+02 | 0.000000E+00 | 1.813323E-01 | -3.392086E-01 | 5.006728E-01 |
| 46 | -4.665303E+00 | 0.000000E+00 | -4.156128E-01 | 7.707702E-01 | -1.092566E+00 |
| 55 | -1.148303E-01 | 0.000000E+00 | -3.614360E-01 | 6.234044E-01 | -6.108415E-01 |
| 56 | 1.271434E+00 | 0.000000E+00 | -8.190649E-01 | 1.299548E+00 | -1.098917E+00 |
| 65 | 1.300715E+00 | 0.000000E+00 | -9.011739E-01 | 1.245529E+00 | -1.004949E+00 |
| 66 | -2.328832E+00 | 0.000000E+00 | -3.250131E-01 | 3.001487E-01 | -1.508980E-01 |
| Surface | $a_{10}$ | $a_{12}$ | $a_{14}$ | $a_{16}$ | |
| 15 | -2.696005E-02 | 2.679434E-03 | 0.000000E+00 | 0.000000E+00 | |
| 16 | 0.000000E+00 | 0.000000E+00 | 0.000000E+00 | 0.000000E+00 | |
| 25 | -8.205413E+00 | 5.227588E+01 | -1.206211E+02 | 0.000000E+00 | |
| 26 | -6.624686E+00 | 1.567656E+01 | -1.526006E+01 | 0.000000E+00 | |
| 35 | 3.580000E+01 | -7.234249E+01 | 5.516628E+01 | 0.000000E+00 | |
| 36 | -2.949905E+00 | 3.597119E+00 | -2.071885E+00 | 4.715672E-01 | |
| 45 | -4.960109E-01 | 2.988451E-01 | -9.805206E-02 | 1.298545E-02 | |
| 46 | 9.493046E-01 | -4.820126E-01 | 1.319901E-01 | -1.511935E-02 | |
| 55 | 2.887411E-01 | -6.526729E-02 | 6.086753E-03 | -1.114549E-04 | |
| 56 | 4.772731E-01 | -1.020045E-01 | 8.746007E-03 | -6.709706E-05 | |
| 65 | 4.723273E-01 | -1.265859E-01 | 1.769314E-02 | -9.928444E-04 | |
| 66 | 4.540027E-02 | -8.172360E-03 | 8.073169E-04 | -3.360627E-05 | |

FIG. 13

| Third embodiment | | | | | | |
|---|---|---|---|---|---|---|
| Effective focal length=1.514 mm, Half field of view=63.665°, F-number=2.4, System length=5.576 mm, Image height=2.520 mm | | | | | | |
| Element | Surface | Radius (mm) | Thickness (mm) | Refractive index | Abbe Number | Focal length (mm) |
| Object | | Infinity | Infinity | | | |
| First lens element 1 | Object-side surface 15 | 3.164 | 0.410 | 1.545 | 55.987 | -2.233 |
| | Image-side surface 16 | 0.840 | 1.052 | | | |
| Aperture 0 | | Infinity | -0.026 | | | |
| Second lens element 2 | Object-side surface 25 | 1.806 | 0.656 | 1.535 | 55.635 | 1.677 |
| | Image-side surface 26 | -1.563 | 0.163 | | | |
| Third lens element 3 | Object-side surface 35 | 3.125 | 0.240 | 1.642 | 22.409 | -4.339 |
| | Image-side surface 36 | 1.435 | 0.190 | | | |
| Fourth lens element 4 | Object-side surface 45 | -11.918 | 0.699 | 1.535 | 55.635 | 2.972 |
| | Image-side surface 46 | -1.435 | 0.138 | | | |
| Fifth lens element 5 | Object-side surface 55 | 2.875 | 0.818 | 1.545 | 55.987 | 13.726 |
| | Image-side surface 56 | 4.195 | 0.063 | | | |
| Sixth lens element 6 | Object-side surface 65 | 3.199 | 0.351 | 1.642 | 22.409 | -11.328 |
| | Image-side surface 66 | 2.131 | 0.462 | | | |
| Filter 9 | Object-side surface 95 | Infinity | 0.210 | | | |
| | Image-side surface 96 | Infinity | 0.150 | | | |
| | Image plane 99 | Infinity | | | | |

FIG. 16

| Surface | K | $a_2$ | $a_4$ | $a_6$ | $a_8$ |
|---|---|---|---|---|---|
| 15 | 2.705456E+00 | 0.000000E+00 | 2.343791E-01 | -2.445655E-01 | 1.033419E-01 |
| 16 | -2.253528E+00 | 0.000000E+00 | 9.518732E-01 | -5.331405E-01 | 0.000000E+00 |
| 25 | -2.067266E-02 | 0.000000E+00 | -1.021665E-01 | -4.038529E-02 | -2.015541E+00 |
| 26 | 3.530835E+00 | 0.000000E+00 | -5.067237E-01 | 2.208407E+00 | -7.809358E+00 |
| 35 | -5.702351E-01 | 0.000000E+00 | -1.378930E+00 | 3.241934E+00 | -8.414334E+00 |
| 36 | 4.488669E-01 | 0.000000E+00 | -9.174353E-01 | 1.775871E+00 | -3.004102E+00 |
| 45 | 9.372178E+01 | 0.000000E+00 | 3.089042E-01 | -7.985998E-01 | 1.739789E+00 |
| 46 | -2.074616E+01 | 0.000000E+00 | -7.545611E-01 | 2.379472E+00 | -5.295218E+00 |
| 55 | 1.470969E+00 | 0.000000E+00 | -3.546692E-01 | 7.017792E-01 | -1.085444E+00 |
| 56 | 2.932109E+00 | 0.000000E+00 | -1.549569E+00 | 3.429112E+00 | -4.033204E+00 |
| 65 | 1.086376E+00 | 0.000000E+00 | -1.548686E+00 | 2.954818E+00 | -3.110486E+00 |
| 66 | -6.703589E-01 | 0.000000E+00 | -3.041273E-01 | 2.887694E-01 | -1.618313E-01 |
| Surface | $a_{10}$ | $a_{12}$ | $a_{14}$ | $a_{16}$ | |
| 15 | -2.536358E-02 | 2.514724E-03 | 0.000000E+00 | 0.000000E+00 | |
| 16 | 0.000000E+00 | 0.000000E+00 | 0.000000E+00 | 0.000000E+00 | |
| 25 | 5.485090E+00 | -1.056920E+01 | -1.100352E+01 | -7.883220E-01 | |
| 26 | 1.620917E+01 | -1.977852E+01 | 1.073869E+01 | -1.405577E+00 | |
| 35 | 1.525450E+01 | -1.915515E+01 | 1.117161E+01 | 8.895697E-01 | |
| 36 | 3.506264E+00 | -2.532859E+00 | 1.050245E+00 | -2.110969E-01 | |
| 45 | -2.873866E+00 | 2.933159E+00 | -1.554056E+00 | 3.307550E-01 | |
| 46 | 7.026760E+00 | -5.442726E+00 | 2.241859E+00 | -3.646681E-01 | |
| 55 | 5.014040E-01 | 1.150817E-01 | -1.300244E-01 | 2.050302E-02 | |
| 56 | 2.453898E+00 | -7.621454E-01 | 1.089970E-01 | -5.068172E-03 | |
| 65 | 1.777271E+00 | -5.349855E-01 | 7.403614E-02 | -2.861351E-03 | |
| 66 | 5.051057E-02 | -8.680821E-03 | 7.523126E-04 | -2.462257E-05 | |

FIG. 17

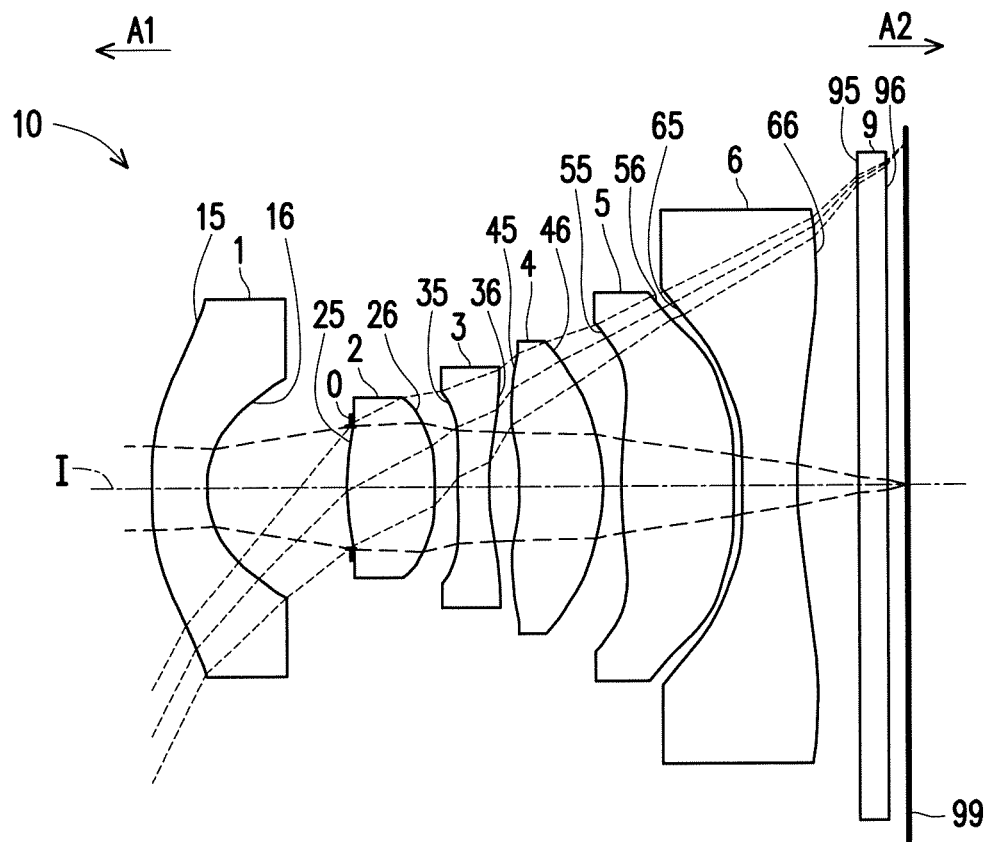
FIG. 18
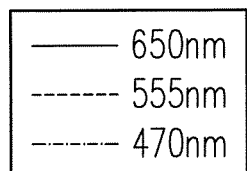
— 650nm
---- 555nm
—·—·— 470nm
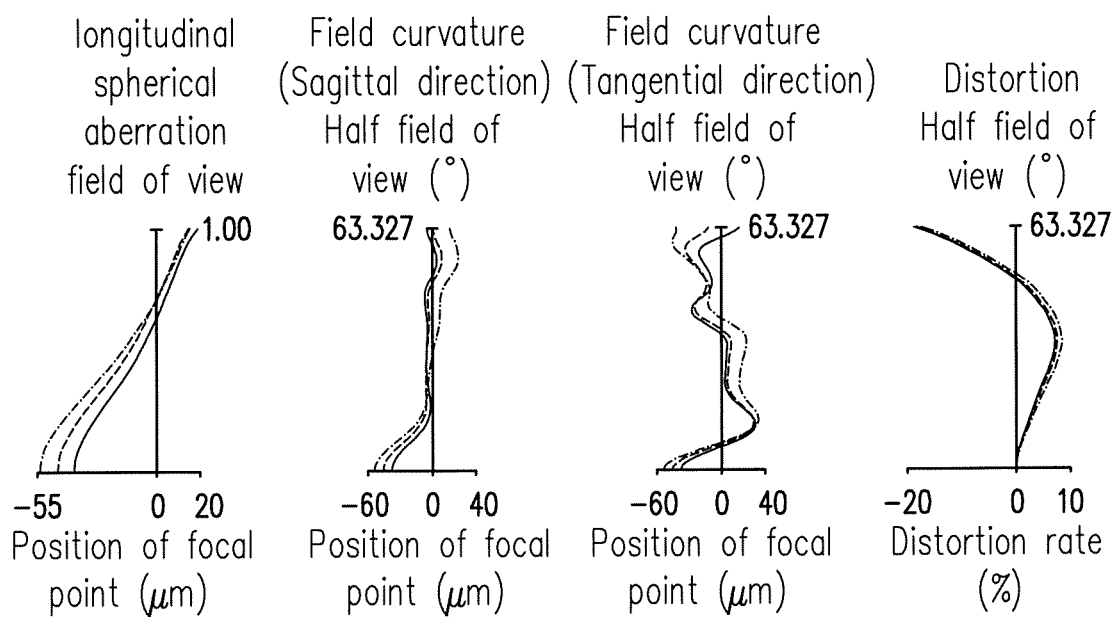
FIG. 19A    FIG. 19B    FIG. 19C    FIG. 19D

| Fourth embodiment | | | | | | |
|---|---|---|---|---|---|---|
| Effective focal length=1.523 mm, Half field of view=63.327°, F-number=2.4, System length=5.559 mm, Image height=2.520 mm | | | | | | |
| Element | Surface | Radius (mm) | Thickness (mm) | Refractive index | Abbe Number | Focal length (mm) |
| Object | | Infinity | Infinity | | | |
| First lens element 1 | Object-side surface 15 | 3.150 | 0.410 | 1.545 | 55.987 | -2.224 |
| | Image-side surface 16 | 0.837 | 1.052 | | | |
| Aperture 0 | | Infinity | -0.026 | | | |
| Second lens element 2 | Object-side surface 25 | 1.810 | 0.653 | 1.535 | 55.635 | 1.677 |
| | Image-side surface 26 | -1.563 | 0.165 | | | |
| Third lens element 3 | Object-side surface 35 | 3.151 | 0.230 | 1.642 | 22.409 | -4.311 |
| | Image-side surface 36 | 1.437 | 0.191 | | | |
| Fourth lens element 4 | Object-side surface 45 | -11.573 | 0.648 | 1.535 | 55.635 | 3.015 |
| | Image-side surface 46 | -1.447 | 0.136 | | | |
| Fifth lens element 5 | Object-side surface 55 | 2.892 | 0.818 | 1.545 | 55.987 | 14.133 |
| | Image-side surface 56 | 4.161 | 0.061 | | | |
| Sixth lens element 6 | Object-side surface 65 | 3.322 | 0.407 | 1.642 | 22.409 | -10.995 |
| | Image-side surface 66 | 2.156 | 0.455 | | | |
| Filter 9 | Object-side surface 95 | Infinity | 0.210 | | | |
| | Image-side surface 96 | Infinity | 0.150 | | | |
| | Image plane 99 | Infinity | | | | |

FIG. 20

| Surface | K | $a_2$ | $a_4$ | $a_6$ | $a_8$ |
|---|---|---|---|---|---|
| 15 | 2.741439E+00 | 0.000000E+00 | 2.343791E-01 | -2.445655E-01 | 1.033419E-01 |
| 16 | -2.185177E+00 | 0.000000E+00 | 9.518732E-01 | -5.331405E-01 | 0.000000E+00 |
| 25 | -1.116018E-01 | 0.000000E+00 | -1.042609E-01 | -4.355618E-02 | -2.023914E+00 |
| 26 | 3.533507E+00 | 0.000000E+00 | -5.060454E-01 | 2.203461E+00 | -7.813711E+00 |
| 35 | 5.325468E-01 | 0.000000E+00 | -1.374279E+00 | 3.247759E+00 | -8.410886E+00 |
| 36 | 4.372953E-01 | 0.000000E+00 | -9.203107E-01 | 1.775024E+00 | -3.004165E+00 |
| 45 | 9.681881E+01 | 0.000000E+00 | 3.079183E-01 | -7.994382E-01 | 1.738855E+00 |
| 46 | -2.158719E+01 | 0.000000E+00 | -7.513083E-01 | 2.380526E+00 | -5.294628E+00 |
| 55 | 1.506842E+00 | 0.000000E+00 | -3.546348E-01 | 7.022148E-01 | -1.085045E+00 |
| 56 | 3.285659E+00 | 0.000000E+00 | -1.547170E+00 | 3.428985E+00 | -4.033281E+00 |
| 65 | 1.653805E+00 | 0.000000E+00 | -1.545732E+00 | 2.957000E+00 | -3.109637E+00 |
| 66 | -6.425473E-01 | 0.000000E+00 | -2.946845E-01 | 2.762815E-01 | -1.525186E-01 |
| Surface | $a_{10}$ | $a_{12}$ | $a_{14}$ | $a_{16}$ | |
| 15 | -2.536358E-02 | 2.514724E-03 | 0.000000E+00 | 0.000000E+00 | |
| 16 | 0.000000E+00 | 0.000000E+00 | 0.000000E+00 | 0.000000E+00 | |
| 25 | 5.476240E+00 | -1.062412E+01 | -1.129988E+01 | -2.391264E+00 | |
| 26 | 1.620531E+01 | -1.978227E+01 | 1.073161E+01 | -1.426574E+00 | |
| 35 | 1.525777E+01 | -1.914750E+01 | 1.119232E+01 | 9.430561E-01 | |
| 36 | 3.506364E+00 | -2.533089E+00 | 1.049166E+00 | -2.129861E-01 | |
| 45 | -2.874734E+00 | 2.932464E+00 | -1.554535E+00 | 3.305038E-01 | |
| 46 | 7.027189E+00 | -5.442233E+00 | 2.242379E+00 | -3.641956E-01 | |
| 55 | 5.013657E-01 | 1.148416E-01 | -1.302784E-01 | 2.030876E-02 | |
| 56 | 2.453791E+00 | -7.621515E-01 | 1.090111E-01 | -5.058391E-03 | |
| 65 | 1.777487E+00 | -5.349492E-01 | 7.403586E-02 | -2.863828E-03 | |
| 66 | 4.690755E-02 | -7.941961E-03 | 6.784444E-04 | -2.185041E-05 | |

FIG. 21

| Fifth embodiment | | | | | | |
|---|---|---|---|---|---|---|
| Effective focal length=1.320 mm, Half field of view=62.592°, F-number=2.4, System length=5.135 mm, Image height=2.520 mm | | | | | | |
| Element | Surface | Radius (mm) | Thickness (mm) | Refractive index | Abbe Number | Focal length (mm) |
| Object | | Infinity | Infinity | | | |
| First lens element 1 | Object-side surface 15 | 3.287 | 0.341 | 1.545 | 55.987 | -2.201 |
| | Image-side surface 16 | 0.848 | 1.009 | | | |
| Aperture 0 | | Infinity | 0.011 | | | |
| Second lens element 2 | Object-side surface 25 | 1.747 | 0.719 | 1.535 | 55.635 | 1.673 |
| | Image-side surface 26 | -1.579 | 0.172 | | | |
| Third lens element 3 | Object-side surface 35 | 3.575 | 0.233 | 1.642 | 22.409 | -3.911 |
| | Image-side surface 36 | 1.444 | 0.104 | | | |
| Fourth lens element 4 | Object-side surface 45 | -10.206 | 0.736 | 1.535 | 55.635 | 2.737 |
| | Image-side surface 46 | -1.315 | 0.040 | | | |
| Fifth lens element 5 | Object-side surface 55 | 2.082 | 0.457 | 1.545 | 55.987 | 7.263 |
| | Image-side surface 56 | 4.041 | 0.040 | | | |
| Sixth lens element 6 | Object-side surface 65 | 1.439 | 0.305 | 1.642 | 22.409 | -10.148 |
| | Image-side surface 66 | 1.082 | 0.512 | | | |
| Filter 9 | Object-side surface 95 | Infinity | 0.210 | | | |
| | Image-side surface 96 | Infinity | 0.247 | | | |
| | Image plane 99 | Infinity | | | | |

FIG. 24

| Surface | K | $a_2$ | $a_4$ | $a_6$ | $a_8$ |
|---|---|---|---|---|---|
| 15 | 2.944179E+00 | 0.000000E+00 | 2.337833E-01 | -2.438616E-01 | 1.037524E-01 |
| 16 | -3.630554E+00 | 0.000000E+00 | 1.109147E+00 | -8.062469E-01 | 0.000000E+00 |
| 25 | -2.365500E+00 | 0.000000E+00 | -1.031209E-01 | -2.851632E-01 | -1.694629E+00 |
| 26 | 3.766621E+00 | 0.000000E+00 | -6.243666E-01 | 1.746251E+00 | -5.229337E+00 |
| 35 | -4.680617E-01 | 0.000000E+00 | -1.753420E+00 | 3.784659E+00 | -1.043701E+01 |
| 36 | 5.406279E-01 | 0.000000E+00 | -1.244267E+00 | 3.092016E+00 | -6.070820E+00 |
| 45 | 8.844468E+01 | 0.000000E+00 | 3.423301E-01 | -4.642738E-01 | 9.503366E-01 |
| 46 | -1.677421E+01 | 0.000000E+00 | -1.203156E+00 | 5.117155E+00 | -1.339723E+01 |
| 55 | -1.621706E+00 | 0.000000E+00 | -6.985070E-01 | 1.636359E+00 | -1.979200E+00 |
| 56 | 5.302893E+00 | 0.000000E+00 | -2.224015E+00 | 6.512154E+00 | -1.077555E+01 |
| 65 | -2.602429E-01 | 0.000000E+00 | -2.174716E+00 | 6.047669E+00 | -1.127366E+01 |
| 66 | -3.677158E+00 | 0.000000E+00 | -2.872066E-01 | 2.629141E-01 | -1.419275E-01 |
| Surface | $a_{10}$ | $a_{12}$ | $a_{14}$ | $a_{16}$ | |
| 15 | -2.522228E-02 | 2.511566E-03 | 0.000000E+00 | 0.000000E+00 | |
| 16 | 0.000000E+00 | 0.000000E+00 | 0.000000E+00 | 0.000000E+00 | |
| 25 | 3.657039E+00 | 1.600002E-01 | -1.196815E+02 | 0.000000E+00 | |
| 26 | 3.878741E+00 | 8.180796E+00 | -1.499955E+01 | 0.000000E+00 | |
| 35 | 2.288561E+01 | -4.282009E+01 | 3.723262E+01 | 0.000000E+00 | |
| 36 | 7.363203E+00 | -5.037773E+00 | 1.788915E+00 | -2.946080E-01 | |
| 45 | -2.783038E+00 | 4.366951E+00 | -3.088217E+00 | 8.221128E-01 | |
| 46 | 2.091177E+01 | -1.934395E+01 | 9.659418E+00 | -1.963554E+00 | |
| 55 | -4.009997E-01 | 2.467067E+00 | -1.668381E+00 | 3.510375E-01 | |
| 56 | 9.901105E+00 | -4.962454E+00 | 1.269528E+00 | -1.307890E-01 | |
| 65 | 1.298180E+01 | -8.865267E+00 | 3.286459E+00 | -5.126387E-01 | |
| 66 | 4.320218E-02 | -6.843082E-03 | 3.845086E-04 | 1.057293E-05 | |

FIG. 25

| Sixth embodiment ||||||
|---|---|---|---|---|---|
| Effective focal length=1.502 mm, Half field of view=61.020°, F-number=2.4, System length=5.231 mm, Image height=2.520 mm ||||||
| Element | Surface | Radius (mm) | Thickness (mm) | Refractive index | Abbe Number | Focal length (mm) |
| Object | | Infinity | Infinity | | | |
| First lens element 1 | Object-side surface 15 | 2.849 | 0.200 | 1.545 | 55.987 | -2.820 |
| | Image-side surface 16 | 0.975 | 1.141 | | | |
| Aperture 0 | | Infinity | -0.004 | | | |
| Second lens element 2 | Object-side surface 25 | 1.792 | 0.724 | 1.535 | 55.635 | 1.733 |
| | Image-side surface 26 | -1.658 | 0.195 | | | |
| Third lens element 3 | Object-side surface 35 | 3.063 | 0.200 | 1.642 | 22.409 | -4.455 |
| | Image-side surface 36 | 1.447 | 0.127 | | | |
| Fourth lens element 4 | Object-side surface 45 | -10.679 | 0.709 | 1.535 | 55.635 | 7.415 |
| | Image-side surface 46 | -2.965 | 0.121 | | | |
| Fifth lens element 5 | Object-side surface 55 | 1.345 | 0.629 | 1.545 | 55.987 | 2.788 |
| | Image-side surface 56 | 9.589 | 0.157 | | | |
| Sixth lens element 6 | Object-side surface 65 | 3.242 | 0.420 | 1.642 | 22.409 | -3.230 |
| | Image-side surface 66 | 1.207 | 0.179 | | | |
| Filter 9 | Object-side surface 95 | Infinity | 0.210 | | | |
| | Image-side surface 96 | Infinity | 0.223 | | | |
| | Image plane 99 | Infinity | | | | |

FIG. 28

| Surface | K | $a_2$ | $a_4$ | $a_6$ | $a_8$ |
|---|---|---|---|---|---|
| 15 | 1.853102E+00 | 0.000000E+00 | 2.463642E-01 | -2.450577E-01 | 1.005164E-01 |
| 16 | -3.974210E+00 | 0.000000E+00 | 8.313430E-01 | -4.122654E-01 | 0.000000E+00 |
| 25 | 5.012888E-01 | 0.000000E+00 | -1.008210E-01 | -5.986093E-02 | -1.534734E+00 |
| 26 | 3.679645E+00 | 0.000000E+00 | -3.433290E-01 | 1.241210E+00 | -4.419453E+00 |
| 35 | 3.019519E+00 | 0.000000E+00 | -1.360822E+00 | 2.710697E+00 | -6.758211E+00 |
| 36 | 4.425628E-01 | 0.000000E+00 | -9.562794E-01 | 1.845415E+00 | -2.855809E+00 |
| 45 | 8.785842E+01 | 0.000000E+00 | 3.495017E-01 | -8.483980E-01 | 1.996900E+00 |
| 46 | -1.988347E+01 | 0.000000E+00 | -7.491203E-01 | 2.495071E+00 | -5.882685E+00 |
| 55 | -3.489710E+00 | 0.000000E+00 | -8.478075E-01 | 2.600785E+00 | -5.294929E+00 |
| 56 | 2.357334E+01 | 0.000000E+00 | -1.409018E+00 | 3.663933E+00 | -5.787146E+00 |
| 65 | -3.528209E+01 | 0.000000E+00 | -1.564873E+00 | 3.221417E+00 | -4.354570E+00 |
| 66 | -5.042565E+00 | 0.000000E+00 | -3.798549E-01 | 3.787182E-01 | -2.016063E-01 |
| Surface | $a_{10}$ | $a_{12}$ | $a_{14}$ | $a_{16}$ | |
| 15 | -2.600689E-02 | 3.119263E-03 | 0.000000E+00 | 0.000000E+00 | |
| 16 | 0.000000E+00 | 0.000000E+00 | 0.000000E+00 | 0.000000E+00 | |
| 25 | 4.379109E+00 | -5.730979E+00 | -1.902079E+01 | 0.000000E+00 | |
| 26 | 8.490515E+00 | -9.086137E+00 | 3.592512E+00 | 0.000000E+00 | |
| 35 | 1.145580E+01 | -1.382606E+01 | 7.988670E+00 | 0.000000E+00 | |
| 36 | 2.562209E+00 | -9.726834E-01 | -3.997809E-02 | 6.637361E-02 | |
| 45 | -3.460870E+00 | 3.547499E+00 | -1.875718E+00 | 4.010308E-01 | |
| 46 | 8.105496E+00 | -6.401291E+00 | 2.641710E+00 | -4.288115E-01 | |
| 55 | 6.508336E+00 | -5.257768E+00 | 2.470582E+00 | -4.890512E-01 | |
| 56 | 5.408757E+00 | -3.094543E+00 | 1.015596E+00 | -1.457811E-01 | |
| 65 | 3.764232E+00 | -1.971029E+00 | 5.662887E-01 | -7.011630E-02 | |
| 66 | 6.245681E-02 | -1.135781E-02 | 1.123288E-03 | -4.697744E-05 | |

FIG. 29

| Seventh embodiment | | | | | | |
|---|---|---|---|---|---|---|
| Effective focal length=1.355 mm, Half field of view=62.140°, F-number=2.4, System length=5.434 mm, Image height=2.520 mm | | | | | | |
| Element | Surface | Radius (mm) | Thickness (mm) | Refractive index | Abbe Number | Focal length (mm) |
| Object | | Infinity | Infinity | | | |
| First lens element 1 | Object-side surface 15 | 3.215 | 0.295 | 1.545 | 55.987 | -2.158 |
| | Image-side surface 16 | 0.835 | 1.072 | | | |
| Aperture 0 | | Infinity | 0.013 | | | |
| Second lens element 2 | Object-side surface 25 | 1.787 | 0.707 | 1.535 | 55.635 | 1.682 |
| | Image-side surface 26 | -1.571 | 0.208 | | | |
| Third lens element 3 | Object-side surface 35 | 3.473 | 0.200 | 1.642 | 22.409 | -3.973 |
| | Image-side surface 36 | 1.444 | 0.098 | | | |
| Fourth lens element 4 | Object-side surface 45 | -10.409 | 0.629 | 1.535 | 55.635 | 81.865 |
| | Image-side surface 46 | -8.592 | 0.088 | | | |
| Fifth lens element 5 | Object-side surface 55 | 1.134 | 0.818 | 1.545 | 55.987 | 2.000 |
| | Image-side surface 56 | -22.247 | 0.040 | | | |
| Sixth lens element 6 | Object-side surface 65 | 3.205 | 0.545 | 1.642 | 22.409 | -5.148 |
| | Image-side surface 66 | 1.525 | 0.175 | | | |
| Filter 9 | Object-side surface 95 | Infinity | 0.210 | | | |
| | Image-side surface 96 | Infinity | 0.336 | | | |
| | Image plane 99 | Infinity | | | | |

FIG. 32

| Surface | K | $a_2$ | $a_4$ | $a_6$ | $a_8$ |
|---|---|---|---|---|---|
| 15 | 2.939190E+00 | 0.000000E+00 | 2.346662E-01 | -2.445024E-01 | 1.033472E-01 |
| 16 | -3.841325E+00 | 0.000000E+00 | 1.084018E+00 | -7.256394E-01 | 0.000000E+00 |
| 25 | -1.389883E+00 | 0.000000E+00 | -1.016964E-01 | -3.138924E-01 | -5.645646E-01 |
| 26 | 3.664554E+00 | 0.000000E+00 | -4.645896E-01 | 1.294961E+00 | -4.336011E+00 |
| 35 | 1.074146E-01 | 0.000000E+00 | -1.714014E+00 | 3.421418E+00 | -8.477054E+00 |
| 36 | 5.146540E-01 | 0.000000E+00 | -1.267709E+00 | 2.951514E+00 | -5.301044E+00 |
| 45 | 8.771051E+01 | 0.000000E+00 | 3.705861E-01 | -5.505446E-01 | 7.514556E-01 |
| 46 | -3.792945E+01 | 0.000000E+00 | -9.127622E-01 | 3.117844E+00 | -7.454555E+00 |
| 55 | -2.254013E+00 | 0.000000E+00 | -8.352344E-01 | 2.354195E+00 | -4.649169E+00 |
| 56 | -1.799069E+00 | 0.000000E+00 | -2.013952E+00 | 6.138648E+00 | -1.043369E+01 |
| 65 | -7.141719E+00 | 0.000000E+00 | -2.186143E+00 | 5.573691E+00 | -8.875709E+00 |
| 66 | -5.076530E+00 | 0.000000E+00 | -3.927923E-01 | 3.746172E-01 | -1.884422E-01 |
| Surface | $a_{10}$ | $a_{12}$ | $a_{14}$ | $a_{16}$ | |
| 15 | -2.537125E-02 | 2.506550E-03 | 0.000000E+00 | 0.000000E+00 | |
| 16 | 0.000000E+00 | 0.000000E+00 | 0.000000E+00 | 0.000000E+00 | |
| 25 | -4.899809E+00 | 3.463885E+01 | -1.392111E+02 | 0.000000E+00 | |
| 26 | 5.058822E+00 | 1.198439E+00 | -6.886824E+00 | 0.000000E+00 | |
| 35 | 1.643310E+01 | -2.780738E+01 | 2.288288E+01 | 0.000000E+00 | |
| 36 | 5.486221E+00 | -2.337863E+00 | -3.451615E-01 | 4.174386E-01 | |
| 45 | -1.571513E+00 | 2.300040E+00 | -1.575512E+00 | 4.096748E-01 | |
| 46 | 1.080748E+01 | -9.244275E+00 | 4.207074E+00 | -7.557932E-01 | |
| 55 | 5.722737E+00 | -4.618122E+00 | 2.166256E+00 | -4.302430E-01 | |
| 56 | 1.035878E+01 | -6.111248E+00 | 2.009060E+00 | -2.843518E-01 | |
| 65 | 8.584155E+00 | -4.849888E+00 | 1.469645E+00 | -1.856919E-01 | |
| 66 | 5.513750E-02 | -9.408031E-03 | 8.586139E-04 | -3.199785E-05 | |

FIG. 33

| Condition | First embodiment | Second embodiment | Third embodiment | Fourth embodiment |
|---|---|---|---|---|
| T1 | 0.200 | 0.344 | 0.410 | 0.410 |
| G12 | 0.800 | 0.865 | 1.026 | 1.026 |
| T2 | 0.746 | 0.591 | 0.656 | 0.653 |
| G23 | 0.083 | 0.254 | 0.163 | 0.165 |
| T3 | 0.208 | 0.200 | 0.240 | 0.230 |
| G34 | 0.198 | 0.253 | 0.190 | 0.191 |
| T4 | 0.677 | 1.572 | 0.699 | 0.648 |
| G45 | 0.166 | 0.025 | 0.138 | 0.136 |
| T5 | 0.409 | 0.383 | 0.818 | 0.818 |
| G56 | 0.066 | 0.376 | 0.063 | 0.061 |
| T6 | 0.255 | 0.246 | 0.351 | 0.407 |
| G6F | 0.431 | 0.393 | 0.462 | 0.455 |
| TF | 0.210 | 0.210 | 0.210 | 0.210 |
| GFP | 0.083 | 0.040 | 0.150 | 0.150 |
| BFL | 0.725 | 0.643 | 0.821 | 0.815 |
| EFL | 1.679 | 1.442 | 1.514 | 1.523 |
| TL | 3.809 | 5.110 | 4.754 | 4.745 |
| TTL | 4.533 | 5.753 | 5.576 | 5.559 |
| ALT | 2.495 | 3.336 | 3.174 | 3.167 |
| AAG | 1.313 | 1.773 | 1.580 | 1.578 |

FIG. 34

| Condition | First embodiment | Second embodiment | Third embodiment | Fourth embodiment |
|---|---|---|---|---|
| TTL/EFL | 2.700 | 3.990 | 3.683 | 3.650 |
| AAG/(G12+G45) | 1.360 | 1.991 | 1.358 | 1.359 |
| ALT/(G56+T6) | 7.766 | 5.362 | 7.663 | 6.755 |
| (T2+T4)/G12 | 1.779 | 2.500 | 1.321 | 1.268 |
| (T4+T5)/T1 | 5.433 | 5.681 | 3.700 | 3.574 |
| TL/BFL | 5.255 | 7.942 | 5.788 | 5.825 |
| (G12+G34)/(G23+G45) | 4.010 | 4.000 | 4.049 | 4.049 |
| T5/T6 | 1.605 | 1.558 | 2.332 | 2.008 |
| EFL/(T1+T3) | 4.114 | 2.650 | 2.330 | 2.379 |
| ALT/(T1+T6) | 5.484 | 5.653 | 4.172 | 3.872 |
| AAG/(G23+G34) | 4.669 | 3.501 | 4.475 | 4.440 |
| ALT/(T5+G56) | 5.245 | 4.393 | 3.600 | 3.600 |
| (T1+T2)/T6 | 3.707 | 3.800 | 3.040 | 2.608 |
| T2/(G34+G45) | 2.049 | 2.126 | 2.000 | 2.000 |
| EFL/G12 | 2.099 | 1.667 | 1.476 | 1.485 |
| (G12+T2)/T5 | 3.774 | 3.799 | 2.056 | 2.051 |
| T4/(G34+G56) | 2.562 | 2.500 | 2.753 | 2.572 |
| G12/T1 | 3.999 | 2.514 | 2.502 | 2.500 |
| TL/(T2+T3+T4) | 2.335 | 2.163 | 2.981 | 3.100 |

FIG. 35

| Condition | Fifth embodiment | Sixth embodiment | Seventh embodiment |
|---|---|---|---|
| T1 | 0.341 | 0.200 | 0.295 |
| G12 | 1.019 | 1.137 | 1.085 |
| T2 | 0.719 | 0.724 | 0.707 |
| G23 | 0.172 | 0.195 | 0.208 |
| T3 | 0.233 | 0.200 | 0.200 |
| G34 | 0.104 | 0.127 | 0.098 |
| T4 | 0.736 | 0.709 | 0.629 |
| G45 | 0.040 | 0.121 | 0.088 |
| T5 | 0.457 | 0.629 | 0.818 |
| G56 | 0.040 | 0.157 | 0.040 |
| T6 | 0.305 | 0.420 | 0.545 |
| G6F | 0.512 | 0.179 | 0.175 |
| TF | 0.210 | 0.210 | 0.210 |
| GFP | 0.247 | 0.223 | 0.336 |
| BFL | 0.969 | 0.612 | 0.721 |
| EFL | 1.320 | 1.502 | 1.355 |
| TL | 4.166 | 4.618 | 4.713 |
| TTL | 5.135 | 5.231 | 5.434 |
| ALT | 2.791 | 2.882 | 3.194 |
| AAG | 1.375 | 1.736 | 1.519 |

FIG. 36

| Condition | Fifth embodiment | Sixth embodiment | Seventh embodiment |
|---|---|---|---|
| TTL/EFL | 3.890 | 3.482 | 4.010 |
| AAG/(G12+G45) | 1.298 | 1.380 | 1.295 |
| ALT/(G56+T6) | 8.098 | 5.001 | 5.460 |
| (T2+T4)/G12 | 1.428 | 1.260 | 1.231 |
| (T4+T5)/T1 | 3.500 | 6.690 | 4.896 |
| TL/BFL | 4.300 | 7.541 | 6.536 |
| (G12+G34)/(G23+G45) | 5.313 | 4.000 | 4.000 |
| T5/T6 | 1.500 | 1.500 | 1.500 |
| EFL/(T1+T3) | 2.302 | 3.755 | 2.735 |
| ALT/(T1+T6) | 4.321 | 4.651 | 3.800 |
| AAG/(G23+G34) | 4.981 | 5.397 | 4.968 |
| ALT/(T5+G56) | 5.613 | 3.666 | 3.725 |
| (T1+T2)/T6 | 3.477 | 2.203 | 1.839 |
| T2/(G34+G45) | 4.988 | 2.924 | 3.803 |
| EFL/G12 | 1.295 | 1.321 | 1.249 |
| (G12+T2)/T5 | 3.800 | 2.957 | 2.192 |
| T4/(G34+G56) | 5.106 | 2.500 | 4.563 |
| G12/T1 | 2.989 | 5.685 | 3.673 |
| TL/(T2+T3+T4) | 2.469 | 2.828 | 3.068 |

FIG. 37

OPTICAL IMAGING LENS

CROSS REFERENCE TO RELATED APPLICATION

This application is a continuation application of and claims the priority benefit of U.S. application Ser. No. 16/015,212, filed on Jun. 22, 2018, now allowed. The prior U.S. application Ser. No. 16/015,212 claims the priority benefit of China application serial no. 201810293874.9, filed on Mar. 30, 2018. The entirety of each of the above-mentioned patent applications is hereby incorporated by reference herein and made a part of specification.

BACKGROUND OF THE INVENTION

Field of the Invention

The invention relates to an optical imaging lens.

Description of Related Art

In recent years, the popularity of portable electronic products such as mobile phones and digital cameras allowed the rigorous development of imaging module-related techniques, and the imaging module mainly contains devices such as an optical imaging lens, a module holder unit, and a sensor, and the thin and light developing trend of mobile phones and digital cameras also resulted in a greater demand of the compactness of the imaging module. With the advancement of the techniques of charge coupled device (CCD) and complementary metal oxide semiconductor (CMOS) and reduction in size, the length of the optical imaging lens installed in the imaging module also needs to be correspondingly reduced.

On the other hand, to achieve higher and higher standards for imaging quality, the number of optical lenses of the optical imaging lens can be increased to alleviate issues such as aberration and dispersion. However, as the number of optical lenses is increased, the distance from the object-side surface of the first lens element to the image plane along the optical axis is correspondingly increased. As a result, mobile phones, digital cameras, and car lenses cannot be readily made thinner. Moreover, the market demand for lenses with large field of view is also rising. Regarding the issues above, how to design an optical imaging lens with good imaging quality, large field of view and compact size has always been an object for those skilled in the art.

SUMMARY OF THE INVENTION

The invention provides an optical imaging lens that can still maintain good imaging quality under the conditions of reduced system length of lens and expanded field of view.

An embodiment of the invention provides an optical imaging lens including a first lens element, a second lens element, a third lens element, a fourth lens element, a fifth lens element, and a sixth lens element from an object side to an image side in order along an optical axis. The first lens element to the sixth lens element each include an object-side surface facing the object side and allowing imaging rays to pass through and an image-side surface facing the image side and allowing the imaging rays to pass through. An optical axis region of the image-side surface of the third lens element is concave. The fifth lens element has positive refracting power, and an optical axis region of the object-side surface of the fifth lens element is convex. A periphery region of the image-side surface of the sixth lens element is convex. Lens elements of the optical imaging lens are only the six lens elements described above. The optical imaging lens satisfies the following expression: EFL/(T1+T3)≥2.300, wherein EFL is an effective focal length of the optical imaging lens, T1 is a thickness of the first lens element along the optical axis, and T3 is a thickness of the third lens element along the optical axis.

An embodiment of the invention provides an optical imaging lens including a first lens element, a second lens element, a third lens element, a fourth lens element, a fifth lens element, and a sixth lens element from an object side to an image side in order along an optical axis. The first lens element to the sixth lens element each include an object-side surface facing the object side and allowing imaging rays to pass through and an image-side surface facing the image side and allowing the imaging rays to pass through. The third lens element has negative refracting power, and a periphery region of the image-side surface of the third lens element is concave. an optical axis region of the image-side surface of the fifth lens element is concave. Lens elements of the optical imaging lens are only the six lens elements described above. The optical imaging lens satisfies the following expression: EFL/(T1+T3)≥2.300, wherein EFL is an effective focal length of the optical imaging lens, T1 is a thickness of the first lens element along the optical axis, and T3 is a thickness of the third lens element along the optical axis.

An embodiment of the invention provides an optical imaging lens including a first lens element, a second lens element, a third lens element, a fourth lens element, a fifth lens element, and a sixth lens element from an object side to an image side in order along an optical axis. The first lens element to the sixth lens element each include an object-side surface facing the object side and allowing imaging rays to pass through and an image-side surface facing the image side and allowing the imaging rays to pass through. The third lens element has negative refracting power, and a periphery region of the image-side surface of the third lens element is concave. Lens elements of the optical imaging lens are only the six lens elements described above. The optical imaging lens satisfies the following expressions: EFL/(T1+T3) ≥2.300 and TL/BFL≥4.300, wherein EFL is an effective focal length of the optical imaging lens, T1 is a thickness of the first lens element along the optical axis, T3 is a thickness of the third lens element along the optical axis, TL is a distance from the object-side surface of the first lens element to the image-side surface of the sixth lens element along the optical axis, and BFL is a distance from the image-side surface of the sixth lens element to an image plane along the optical axis.

Based on the above, the beneficial effects of the optical imaging lens of the embodiments of the invention are that, with the design of concave-convex shape and arrangement of the object-side surface or the image-side surface of the above-mentioned lens elements and by satisfying the conditional expression above, the aberration of the optical system of the optical imaging lens can be corrected, and the field of view of the optical imaging lens can be expanded. Therefore, the optical imaging lens can still maintain good imaging quality under the condition of reduced system length.

In order to make the aforementioned features and advantages of the disclosure more comprehensible, embodiments accompanied with FIG.s are described in detail below.

BRIEF DESCRIPTION OF THE DRAWINGS

The accompanying drawings are included to provide a further understanding of the invention, and are incorporated

FIG. 6 is a schematic view of an optical imaging lens of a first embodiment of the invention.

FIG. 7A to FIG. 7D are diagrams of a longitudinal spherical aberration and various aberrations of the optical imaging lens of the first embodiment.

FIG. 8 shows detailed optical data of the optical imaging lens of the first embodiment of the invention.

FIG. 9 shows aspheric parameters of the optical imaging lens of the first embodiment of the invention.

FIG. 10 is a schematic view of an optical imaging lens of a second embodiment of the invention.

FIG. 11A to FIG. 11D are diagrams of a longitudinal spherical aberration and various aberrations of the optical imaging lens of the second embodiment.

FIG. 12 shows detailed optical data of the optical imaging lens of the second embodiment of the invention.

FIG. 13 shows aspheric parameters of the optical imaging lens of the second embodiment of the invention.

FIG. 16 shows detailed optical data of the optical imaging lens of the third embodiment of the invention.

FIG. 17 shows aspheric parameters of the optical imaging lens of the third embodiment of the invention.

FIG. 18 is a schematic view of an optical imaging lens of a fourth embodiment of the invention.

FIG. 19A to FIG. 19D are diagrams of a longitudinal spherical aberration and various aberrations of the optical imaging lens of the fourth embodiment.

FIG. 20 shows detailed optical data of the optical imaging lens of the fourth embodiment of the invention.

FIG. 21 shows aspheric parameters of the optical imaging lens of the fourth embodiment of the invention.

FIG. 24 shows detailed optical data of the optical imaging lens of the fifth embodiment of the invention.

FIG. 25 shows aspheric parameters of the optical imaging lens of the fifth embodiment of the invention.

FIG. 28 shows detailed optical data of the optical imaging lens of the sixth embodiment of the invention.

FIG. 29 shows aspheric parameters of the optical imaging lens of the sixth embodiment of the invention.

FIG. 32 shows detailed optical data of the optical imaging lens of the seventh embodiment of the invention.

FIG. 33 shows aspheric parameters of the optical imaging lens of the seventh embodiment of the invention.

FIG. 34 to FIG. 37 show the numeric values of various important parameters and relationship formulas thereof of the optical imaging lenses of the first to seventh embodiments of the invention.

DESCRIPTION OF THE EMBODIMENTS

Figure 1:
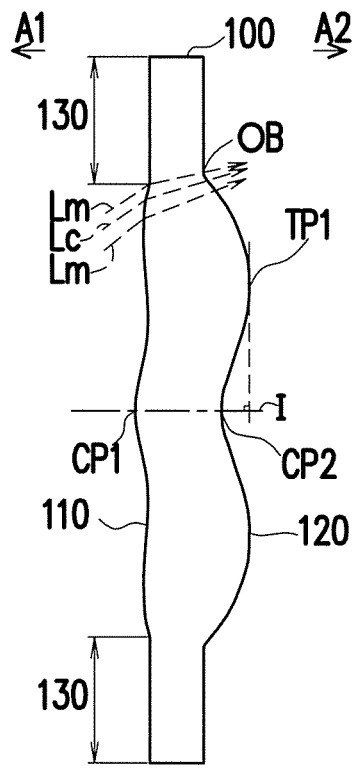
FIG. 1 is a schematic view describing a surface structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
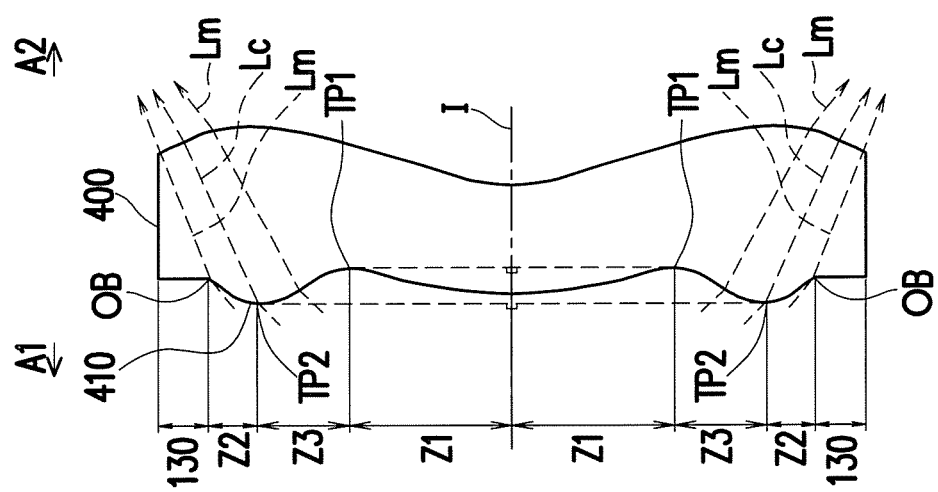
FIG. 4 is a schematic view describing the surface structure of the lens element of a second example.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
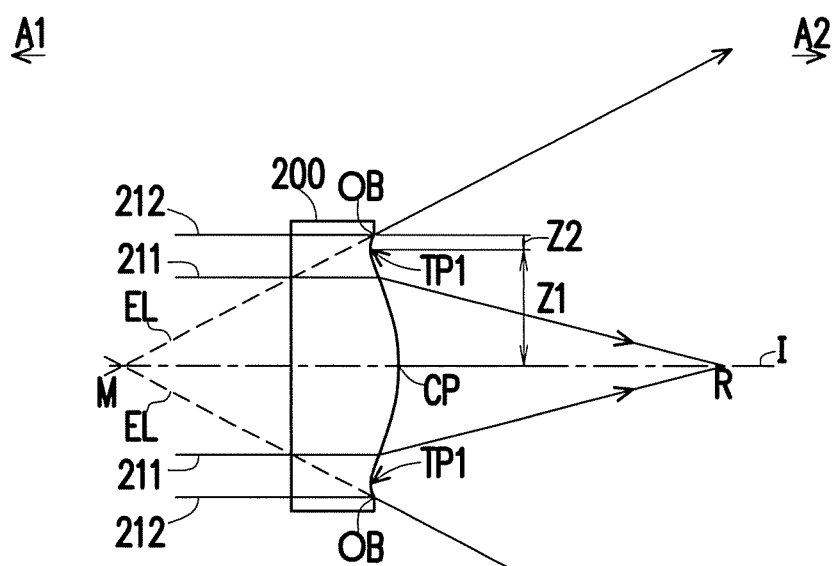
FIG. 2 is a schematic view describing a concave and convex surface structure of a lens element and a ray focal point.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

Figure 5:
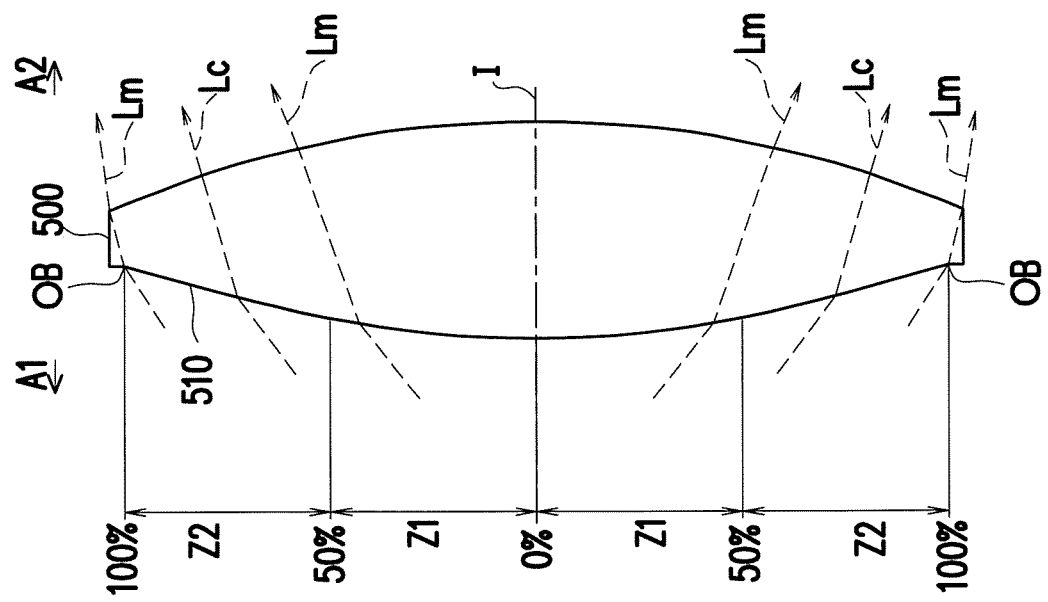
FIG. 5 is a schematic view describing the surface structure of the lens element of a third example.
Figure 3:
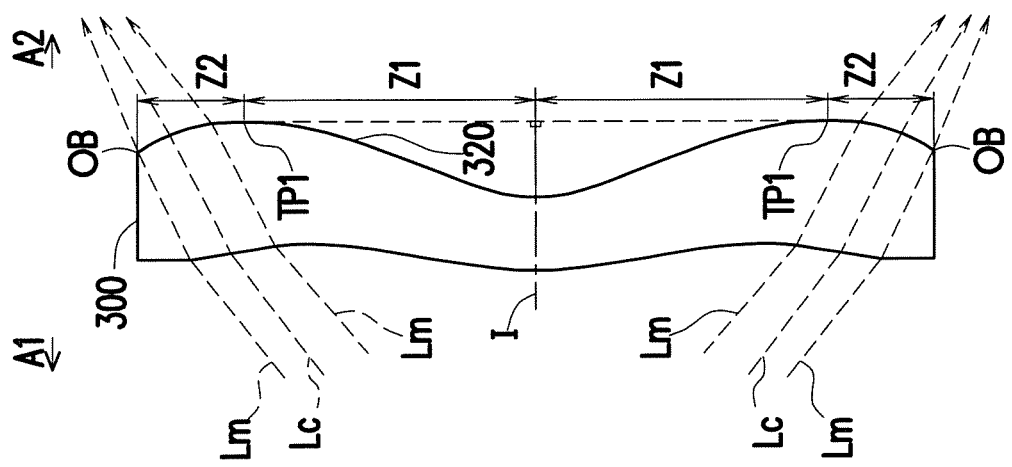
FIG. 3 is a schematic view describing the surface structure of the lens element of a first example.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

FIG. 6 is a schematic view of an optical imaging lens of a first embodiment of the invention, and FIG. 7A to FIG. 7D are diagrams of the longitudinal spherical aberration and various aberrations of the optical imaging lens of the first embodiment. Referring first to FIG. 6, an optical imaging lens 10 of the first embodiment of the invention includes a first lens element 1, an aperture 0, a second lens element 2, a third lens element 3, a fourth lens element 4, a fifth lens element 5, a sixth lens element 6, and a filter 9 from an object side A1 to an image side A2 in order along an optical axis I of the optical imaging lens 10. When a ray emitted by an object to be photographed enters the optical imaging lens 10 and passes through the first lens element 1, the aperture 0, the second lens element 2, the third lens element 3, the fourth lens element 4, the fifth lens element 5, the sixth lens element 6, and the filter 9, an image is formed on an image plane 99. The filter 9 is, for instance, an infrared cut-off filter used to prevent the infrared ray in the light from being transmitted to the image plane 99 and affecting image quality. It should be added that, the object side A1 is a side facing the object to be photographed and the image side A2 is a side facing the image plane 99.

The first lens element 1, the second lens element 2, the third lens element 3, the fourth lens element 4, the fifth lens element 5, the sixth lens element 6, and the filter 9 each include object-side surfaces 15, 25, 35, 45, 55, 65, and 95 facing the object side A1 and allowing imaging rays to pass through and image-side surfaces 16, 26, 36, 46, 56, 66, and 96 facing the image side A2 and allowing the imaging rays to pass through.

Moreover, to satisfy the requirements of a lightweight product and lower cost, the first lens element 1 to the sixth lens element 6 all have refracting power, and the first lens element 1, the second lens element 2, the third lens element 3, the fourth lens element 4, the fifth lens element 5, and the sixth lens element 6 are all made from a plastic material, but the material of the first lens element 1 to the sixth lens element 6 is not limited thereto.

The first lens element 1 has negative refracting power. An optical axis region 151 and a periphery region 153 of the object-side surface 15 of the first lens element 1 are both convex. An optical axis region 162 and a periphery region 164 of the image-side surface 16 of the first lens element 1 are both concave.

The second lens element 2 has positive refracting power. An optical axis region 251 and a periphery region 253 of the object-side surface 25 of the second lens element 2 are both convex. An optical axis region 261 and a periphery region 263 of the image-side surface 26 of the second lens element 2 are both convex.

The third lens element 3 has negative refracting power. An optical axis region 351 of the object-side surface 35 of the third lens element 3 is convex, and a periphery region 354 of the object-side surface 35 of the third lens element 3 is concave. An optical axis region 362 and a periphery region 364 of the image-side surface 36 of the third lens element 3 are both concave.

The fourth lens element 4 has positive refracting power. An optical axis region 452 of the object-side surface 45 of the fourth lens element 4 is concave, and a periphery region 453 of the object-side surface 45 of the fourth lens element 4 is convex. An optical axis region 461 and a periphery region 463 of the image-side surface 46 of the fourth lens element 4 are both convex.

The fifth lens element 5 has positive refracting power. An optical axis region 551 of the object-side surface 55 of the fifth lens element 5 is convex, and a periphery region 554 of the object-side surface 55 of the fifth lens element 5 is concave. An optical axis region 562 of the image-side surface 56 of the fifth lens element 5 is concave, and a periphery region 563 of the image-side surface 56 of the fifth lens element 5 is convex.

The sixth lens element 6 has negative refracting power. An optical axis region 651 of the object-side surface 65 of the sixth lens element 6 is convex, and a periphery region 654 of the object-side surface 65 of the sixth lens element 6 is concave. An optical axis region 662 of the image-side surface 66 of the sixth lens element 6 is concave, and a periphery region 663 of the image-side surface 66 of the sixth lens element 6 is convex.

Moreover, only the six lens elements of the optical imaging lens 10 described above have refracting power.

Other detailed optical data of the first embodiment is as shown in FIG. 8. The effective focal length (EFL) of the whole optical imaging lens 10 of the first embodiment is 1.679 mm, the half field of view (HFOV) is 52.047°, the f-number (Fno) is 2.4, the system length is 4.533 mm, and an image height thereof is 2.520 mm. In particular, the system length refers to a distance from the object-side surface 15 of the first lens element 1 to the image plane 99 along the optical axis I. It should be noted that the "Radius" in the FIGS. 8, 12, 16, 20, 24, 28 and 32 is a radius of curvature (i.e. the "R" value), which is the paraxial radius of shape of a lens surface in the optical axis region.

Moreover, in the present embodiment, the twelve surfaces of the first lens element 1, the second lens element 2, the third lens element 3, the fourth lens element 4, the fifth lens element 5, and the sixth lens element 6, i.e., the object-side surfaces 15, 25, 35, 45, 55, and 65 and the image-side surfaces 16, 26, 36, 46, 56, and 66, are all aspheric surfaces, and the aspheric surfaces are defined according to the following formula:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i} \tag{1}$$

wherein:
R: radius of curvature of the surface of the lens element near the optical axis I;
Y: a perpendicular distance between a point on the aspheric surface curve and the optical axis I;
Z: a depth of the aspheric surface (i.e. a perpendicular distance between the point on the aspheric surface that is spaced by the distance Y from the optical axis and a tangent plane tangent to a vertex of the aspheric surface on the optical axis);
K: conic constant;
$a_{2i}$: $2i^{th}$ aspheric coefficient.

Each aspheric coefficient from the object-side surfaces 15, 25, 35, 45, 55, and 65 to the image-side surfaces 16, 26, 36, 46, 56, and 66 in formula (1) is shown in FIG. 9. In particular, row number 15 in FIG. 9 represents the aspheric coefficients of the object-side surface 15 of the first lens element 1, and the other row fields are defined in a similar manner.

Moreover, the relationship among the important parameters in the optical imaging lens 10 of the first embodiment is as shown in FIG. 34 and FIG. 35.

Wherein,

T1 is the thickness of the first lens element 1 along the optical axis I;

T2 is the thickness of the second lens element 2 along the optical axis I;

T3 is the thickness of the third lens element 3 along the optical axis I;

T4 is the thickness of the fourth lens element 4 along the optical axis I;

T5 is the thickness of the fifth lens element 5 along the optical axis I;

T6 is the thickness of the sixth lens element 6 along the optical axis I;

TF is the thickness of the filter 9 along the optical axis I;

G12 is a distance from the image-side surface 16 of the first lens element 1 to the object-side surface 25 of the second lens element 2 along the optical axis I, i.e., an air gap between the first lens element 1 and the second lens element 2 along the optical axis I;

G23 is a distance from the image-side surface 26 of the second lens element 2 to the object-side surface 35 of the third lens element 3 along the optical axis I, i.e., an air gap between the second lens element 2 and the third lens element 3 along the optical axis I;

G34 is a distance from the image-side surface 36 of the third lens element 3 to the object-side surface 45 of the fourth lens element 4 along the optical axis I, i.e., an air gap between the third lens element 3 and the fourth lens element 4 along the optical axis I;

G45 is a distance from the image-side surface 46 of the fourth lens element 4 to the object-side surface 55 of the fifth lens element 5 along the optical axis I, i.e., an air gap between the fourth lens element 4 and the fifth lens element 5 along the optical axis I;

G56 is a distance from the image-side surface 56 of the fifth lens element 5 to the object-side surface 65 of the sixth lens element 6 along the optical axis I, i.e., an air gap between the fifth lens element 5 and the sixth lens element 6 along the optical axis I;

G6F is a distance from the image-side surface 66 of the sixth lens element 6 to the object-side surface 95 of the filter 9 along the optical axis I, i.e., an air gap between the sixth lens element 6 and the filter 9 along the optical axis I;

GFP is a distance from the image-side surface 96 of the filter 9 to the image plane 99 along the optical axis I, i.e., an air gap between the filter 9 and the image plane 99 along the optical axis I;

AAG is a sum of five air gaps among the first lens element 1 to the sixth lens element 6 along the optical axis I, i.e., the sum of G12, G23, G34, G45, and G56;

ALT is a sum of the thicknesses of the first lens element 1, the second lens element 2, the third lens element 3, the fourth lens element 4, the fifth lens element 5, and the sixth lens element 6 along the optical axis I, i.e., the sum of T1, T2, T3, T4, T5, and T6;

TTL is a distance from the object-side surface 15 of the first lens element 1 to the image plane 99 along the optical axis I;

TL is a distance from the object-side surface 15 of the first lens element 1 to the image-side surface 66 of the sixth lens element 6 along the optical axis I;

BFL is a distance from the image-side surface 66 of the sixth lens element 6 to the image plane 99 along the optical axis I; and EFL is an effective focal length of the optical imaging lens 10.

Moreover, the following are further defined:

f1 is a focal length of the first lens element 1;
f2 is a focal length of the second lens element 2;
f3 is a focal length of the third lens element 3;
f4 is a focal length of the fourth lens element 4;
f5 is a focal length of the fifth lens element 5;
f6 is a focal length of the sixth lens element 6;
n1 is a refractive index of the first lens element 1;
n2 is a refractive index of the second lens element 2;
n3 is a refractive index of the third lens element 3;
n4 is a refractive index of the fourth lens element 4;
n5 is a refractive index of the fifth lens element 5;
n6 is a refractive index of the sixth lens element 6;
V1 is an Abbe number of the first lens element 1, and the Abbe number can also be referred to as the dispersion coefficient;
V2 is an Abbe number of the second lens element 2;
V3 is an Abbe number of the third lens element 3;
V4 is an Abbe number of the fourth lens element 4;
V5 is an Abbe number of the fifth lens element 5; and
V6 is an Abbe number of the sixth lens element 6.

Referring next to FIG. 7A to FIG. 7D, FIG. 7A describes the longitudinal spherical aberration of the first embodiment when the pupil radius is 0.3498 mm. FIG. 7B and FIG. 7C respectively describe the field curvature aberration in the sagittal direction and the field curvature aberration in the tangential direction on the image plane 99 of the first embodiment when the wavelength is 470 nm, 555 nm, and 650 nm. FIG. 7D describes the distortion aberration on the image plane 99 of the first embodiment when the wavelength is 470 nm, 555 nm, and 650 nm. In FIG. 7A which shows the longitudinal spherical aberration of the first embodiment, the curve of each wavelength is close to each other and near the center, indicating that the off-axis rays at different heights of each wavelength are all concentrated near the imaging point, and it can be seen from the deflection margin of the curve of each wavelength that, the imaging point deviation of the off-axis rays at different heights is controlled within a range of ±14 microns (μm), and therefore in the present embodiment, the spherical aberration of the same wavelength is indeed significantly improved. Moreover, the distances between the three representative wavelengths are also relative close, indicating that the imaging positions of the rays with different wavelengths are relatively concentrated, and therefore the chromatic aberration is also significantly improved.

In FIG. 7B and FIG. 7C which illustrate two diagrams of the field curvature aberration, the focal length variation of the three representative wavelengths in the entire field of view is within a range of ±22 microns, indicating that the optical system of the first embodiment can effectively eliminate aberration. In FIG. 7D, the diagram of distortion aberration shows that the distortion aberration of the first embodiment is maintained within a range of ±18%, indicating that the distortion aberration of the first embodiment satisfies the imaging quality requirements of the optical system, and as a result, in comparison to the existing optical lens, in the first embodiment, under the condition that the system length is reduced to about 4.533 mm, good imaging quality can still be provided. Therefore, in the first embodiment, under the condition of maintaining good optical performance, the lens length can be reduced and the shooting angle can be expanded to achieve a product design that is thinner and has increased field of view.

FIG. 10 is a schematic view of an optical imaging lens of a second embodiment of the invention, and FIG. 11A to FIG. 11D are diagrams of the longitudinal spherical aberration and various aberrations of the optical imaging lens of the second embodiment. Referring first to FIG. 10, the second embodiment of the optical imaging lens 10 of the invention is substantially similar to the first embodiment, and the difference between the two is that the optical data, the aspheric coefficients, and the parameters of the lens elements 1, 2, 3, 4, 5, and 6 are slightly different. It should be mentioned here that, to clearly show the drawing, in FIG. 10, the reference numerals of some of the optical axis regions and the periphery regions with the same shape as the first embodiment are omitted.

The detailed optical data of the optical imaging lens 10 is as shown in FIG. 12. The effective focal length of the whole optical imaging lens 10 of the second embodiment is 1.442 mm, the HFOV is 58.050°, the Fno is 2.4, the system length is 5.753 mm, and the image height is 2.520 mm.

FIG. 13 shows each aspheric coefficient of the object-side surfaces 15, 25, 35, 45, 55, and 65 and the image-side surfaces 16, 26, 36, 46, 56, and 66 in formula (1) of the second embodiment.

Moreover, the relationship among the important parameters in the optical imaging lens 10 of the second embodiment is as shown in FIG. 34 and FIG. 35.

In FIG. 11A which shows the longitudinal spherical aberration of the second embodiment in which the pupil radius is 0.3005 mm, the imaging point deviation of the off-axis rays at different heights is controlled within a range of ±22.5 microns. In FIG. 11B and FIG. 11C which illustrate two diagrams of the field curvature aberration, the focal length variation of the three representative wavelengths in the entire field of view is within a range of ±80 microns. In FIG. 11D, the distortion aberration shows that the distortion aberration of the second embodiment is maintained within a range of ±25%. Accordingly, in comparison to the existing optical lens, in the second embodiment, good imaging quality can still be provided under the condition of the system length reduced to about 5.753 mm.

It can be known from the above that, an advantage of the second embodiment in comparison to the first embodiment is that the half field of view of the second embodiment is greater than the half field of view of the first embodiment.

Figure 14:
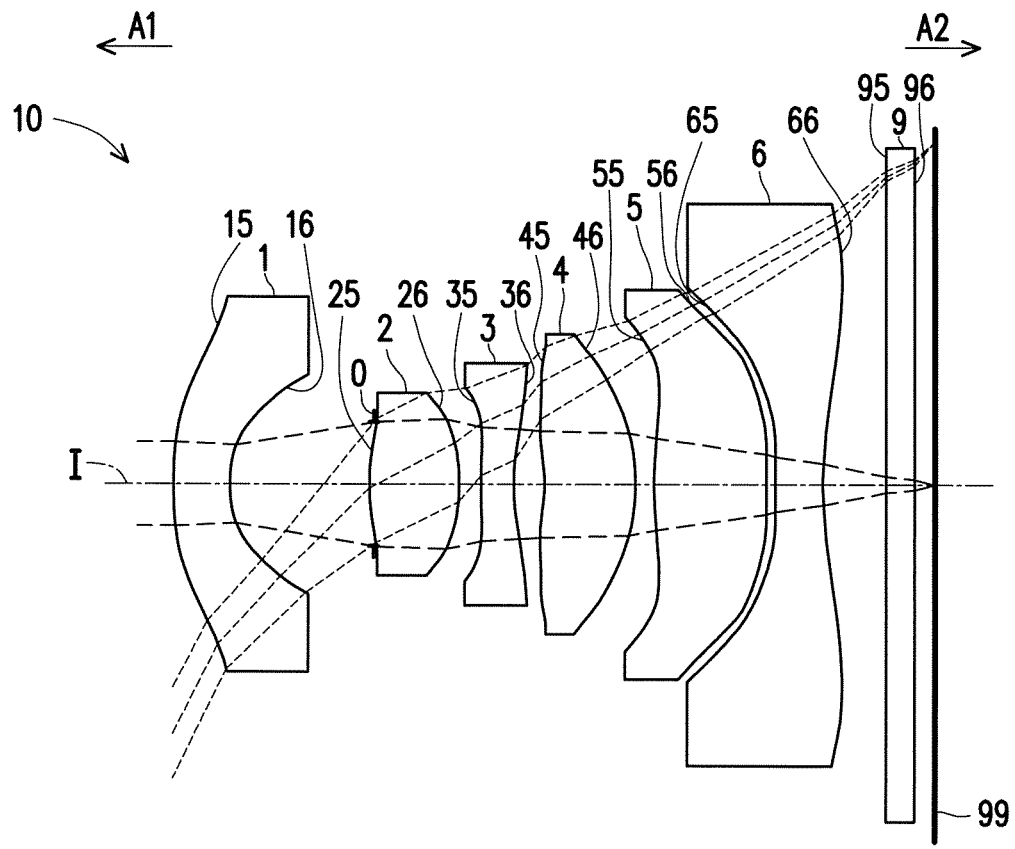
FIG. 14 is a schematic view of an optical imaging lens of a third embodiment of the invention.

FIG. 14 is a schematic view of an optical imaging lens of a third embodiment of the invention, and FIG. 15A to FIG. 15D are diagrams of the longitudinal spherical aberration and various aberrations of the optical imaging lens of the third embodiment. Referring first to FIG. 14, the third embodiment of the optical imaging lens 10 of the invention is substantially similar to the first embodiment, and the difference between the two is that the optical data, the aspheric coefficients, and the parameters of the lens elements 1, 2, 3, 4, 5, and 6 are slightly different. It should be mentioned here that, to clearly show the drawing, in FIG. 14, the reference numerals of the optical axis region and the periphery region with the same shape as the first embodiment are omitted.

The detailed optical data of the optical imaging lens 10 is as shown in FIG. 16. The effective focal length of the whole optical imaging lens 10 of the third embodiment is 1.514 mm, the HFOV is 63.665°, the Fno is 2.4, the system length is 5.576 mm, and the image height is 2.520 mm.

FIG. 17 shows each aspheric coefficient of the object-side surfaces 15, 25, 35, 45, 55, and 65 and the image-side surfaces 16, 26, 36, 46, 56, and 66 in formula (1) of the third embodiment.

Moreover, the relationship among the important parameters in the optical imaging lens 10 of the third embodiment is as shown in FIG. 34 and FIG. 35.

Figures 15A, 15B, 15C, 15D:
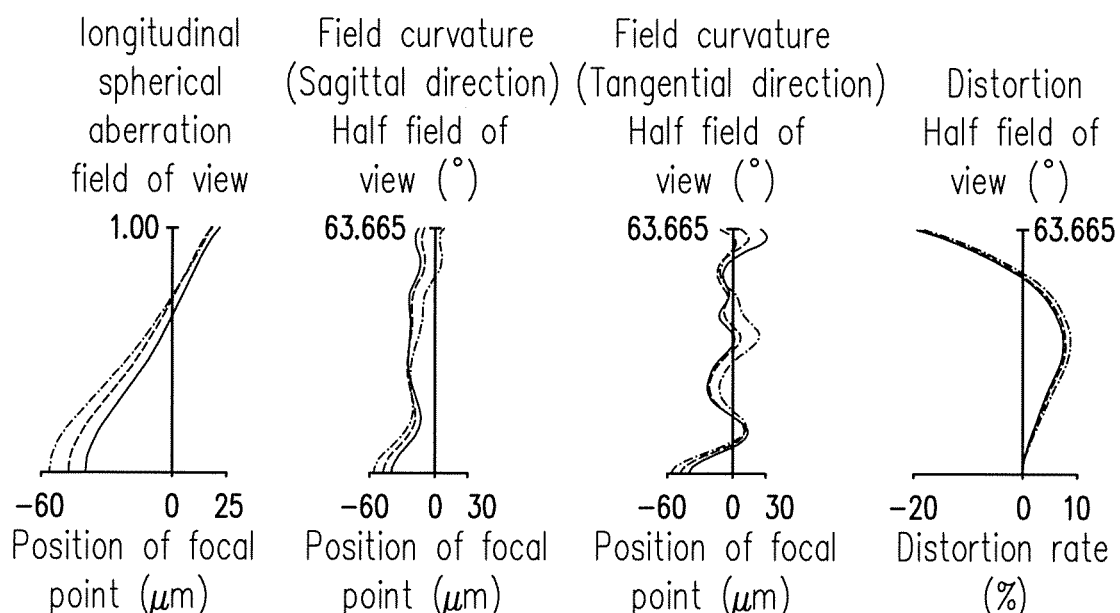
FIG. 15A to FIG. 15D are diagrams of a longitudinal spherical aberration and various aberrations of the optical imaging lens of the third embodiment.

In FIG. 15A which shows the longitudinal spherical aberration of the third embodiment in which the pupil radius is 0.3154 mm, the imaging point deviation of the off-axis rays at different heights is controlled within a range of ±57 microns. In FIG. 15B and FIG. 15C which illustrate two diagrams of the field curvature aberration, the focal length variation of the three representative wavelengths in the entire field of view is within a range of ±57 microns. In FIG. 15D, the distortion aberration shows that the distortion aberration of the third embodiment is maintained within a range of ±20%. Accordingly, in comparison to the existing optical lens, in the third embodiment, good imaging quality can still be provided under the condition of the system length reduced to about 5.576 mm.

It can be known from the above that, an advantage of the third embodiment in comparison to the first embodiment is that the half field of view of the third embodiment is greater than the half field of view of the first embodiment.

FIG. 18 is a schematic view of an optical imaging lens of a fourth embodiment of the invention, and FIG. 19A to FIG. 19D are diagrams of the longitudinal spherical aberration and various aberrations of the optical imaging lens of the fourth embodiment. Referring first to FIG. 18, the fourth embodiment of the optical imaging lens 10 of the invention is substantially similar to the first embodiment, and the difference between the two is that the optical data, the aspheric coefficients, and the parameters of the lens elements 1, 2, 3, 4, 5, and 6 are slightly different. It should be mentioned here that, to clearly show the drawing, in FIG. 18, the reference numerals of the optical axis region and the periphery region with the same shape as the first embodiment are omitted.

The detailed optical data of the optical imaging lens 10 is as shown in FIG. 20. The effective focal length of the whole optical imaging lens 10 of the fourth embodiment is 1.523 mm, the HFOV is 63.327°, the Fno is 2.4, the system length is 5.559 mm, and the image height is 2.520 mm.

FIG. 21 shows each aspheric coefficient of the object-side surfaces 15, 25, 35, 45, 55, and 65 and the image-side surfaces 16, 26, 36, 46, 56, and 66 in formula (1) of the fourth embodiment.

Moreover, the relationship among the important parameters in the optical imaging lens 10 of the fourth embodiment is as shown in FIG. 34 and FIG. 35.

In FIG. 19A which shows the longitudinal spherical aberration of the fourth embodiment in which the pupil radius is 0.3173 mm, the imaging point deviation of the off-axis rays at different heights is controlled within a range of ±55 microns. In FIG. 19B and FIG. 19C which illustrate two diagrams of the field curvature aberration, the focal length variation of the three representative wavelengths in the entire field of view is within a range of ±60 microns. In FIG. 19D, the distortion aberration shows that the distortion aberration of the fourth embodiment is maintained within a range of ±19%. Accordingly, in comparison to the existing optical lens, in the fourth embodiment, good imaging quality can still be provided under the condition of the system length reduced to about 5.559 mm.

It can be known from the above that, an advantage of the fourth embodiment in comparison to the first embodiment is that the half field of view of the fourth embodiment is greater than the half field of view of the first embodiment.

Figure 22:
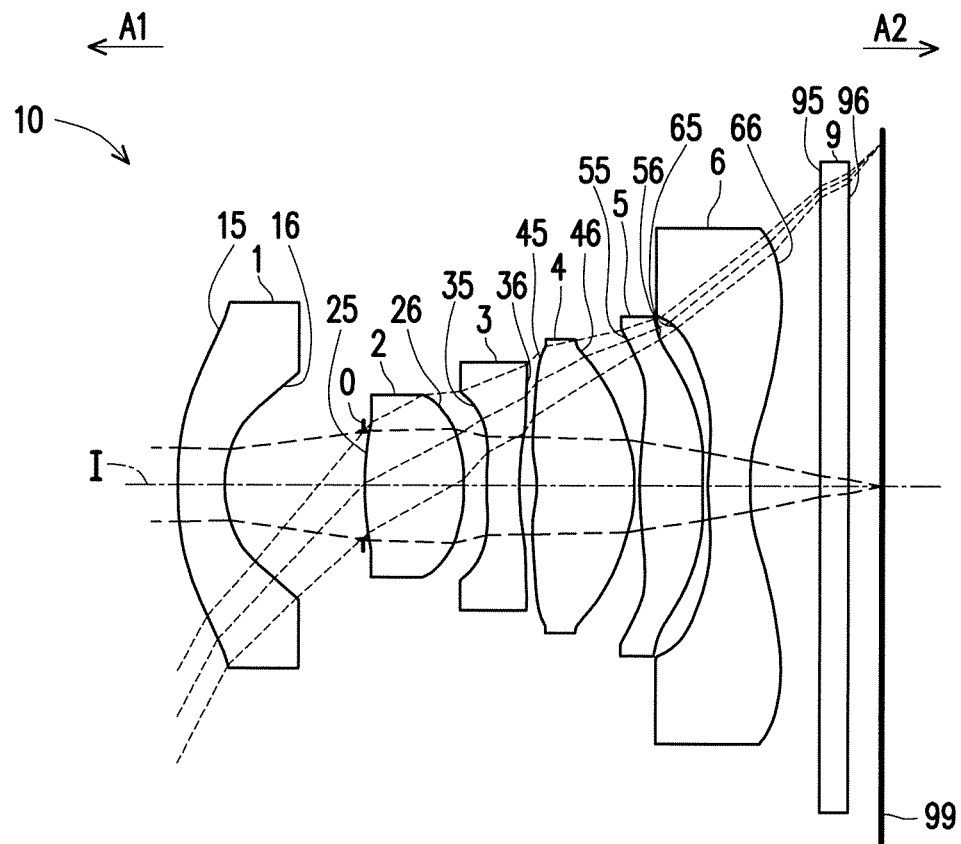
FIG. 22 is a schematic view of an optical imaging lens of a fifth embodiment of the invention.

FIG. 22 is a schematic view of an optical imaging lens of a fifth embodiment of the invention, and FIG. 23A to FIG. 23D are diagrams of the longitudinal spherical aberration and various aberrations of the optical imaging lens of the fifth embodiment. Referring first to FIG. 22, the fifth embodiment of the optical imaging lens 10 of the invention is substantially similar to the first embodiment, and the difference between the two is that the optical data, the aspheric coefficients, and the parameters of the lens elements 1, 2, 3, 4, 5, and 6 are slightly different. It should be mentioned here that, to clearly show the drawing, in FIG. 22, the reference numerals of the optical axis region and the periphery region with the same shape as the first embodiment are omitted.

The detailed optical data of the optical imaging lens 10 is as shown in FIG. 24. The effective focal length of the whole optical imaging lens 10 of the fifth embodiment is 1.320 mm, the HFOV is 62.592°, the Fno is 2.4, the system length is 5.135 mm, and the image height is 2.520 mm.

FIG. 25 shows each aspheric coefficient of the object-side surfaces 15, 25, 35, 45, 55, and 65 and the image-side surfaces 16, 26, 36, 46, 56, and 66 in formula (1) of the fifth embodiment.

Moreover, the relationship among the important parameters in the optical imaging lens 10 of the fifth embodiment is as shown in FIG. 36 and FIG. 37.

Figures 23A, 23B, 23C, 23D:
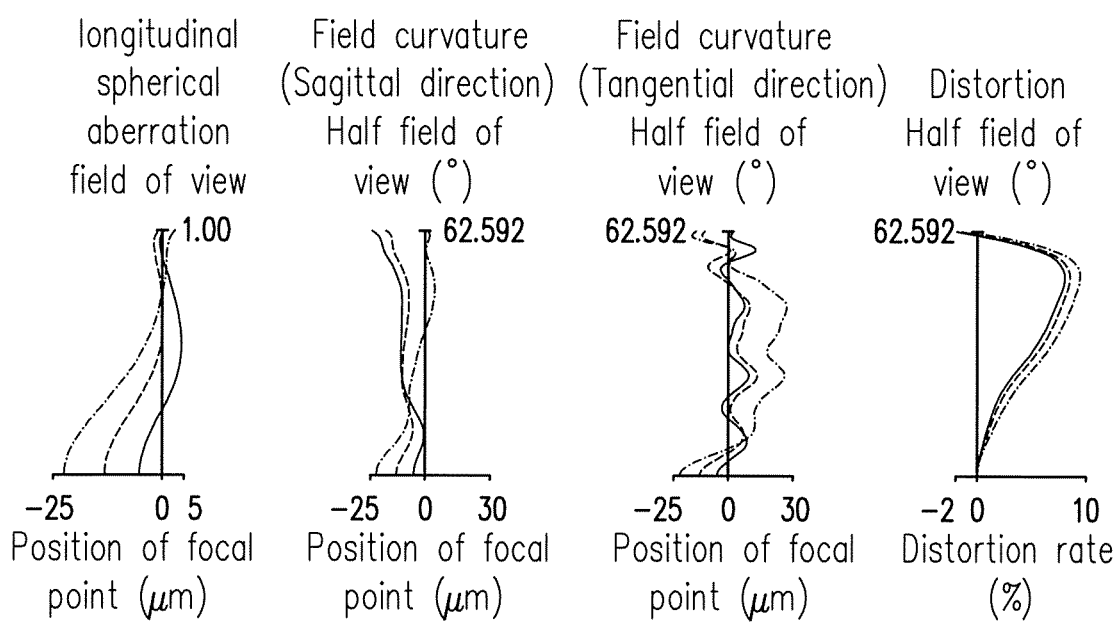
FIG. 23A to FIG. 23D are diagrams of a longitudinal spherical aberration and various aberrations of the optical imaging lens of the fifth embodiment.

In FIG. 23A which shows the longitudinal spherical aberration of the fifth embodiment in which the pupil radius is 0.2750 mm, the imaging point deviation of the off-axis lights at different heights is controlled within a range of ±23 microns. In FIG. 23B and FIG. 23C which illustrate two diagrams of the field curvature aberration, the focal length variation of the three representative wavelengths in the entire field of view is within a range of ±28 microns. In FIG. 23D, the distortion aberration shows that the distortion aberration of the fifth embodiment is maintained within a range of ±9.5%. Accordingly, in comparison to the existing optical lens, in the fifth embodiment, good imaging quality can still be provided under the condition of the system length reduced to about 5.135 mm.

It can be known from the above that, advantages of the fifth embodiment in comparison to the first embodiment are that the half field of view of the fifth embodiment is greater than the half field of view of the first embodiment, and the distortion aberration of the fifth embodiment is less than the distortion aberration of the first embodiment.

Figure 26:
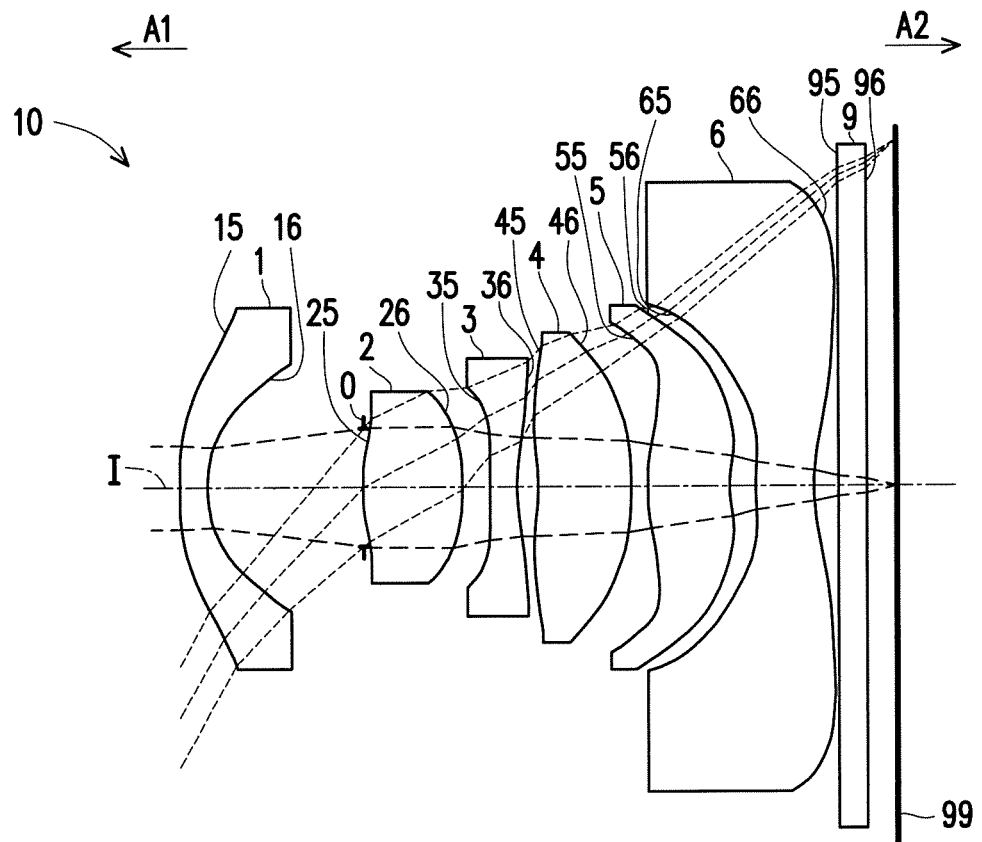
FIG. 26 is a schematic view of an optical imaging lens of a sixth embodiment of the invention.

FIG. 26 is a schematic view of an optical imaging lens of a sixth embodiment of the invention, and FIG. 27A to FIG. 27D are diagrams of the longitudinal spherical aberration and various aberrations of the optical imaging lens of the sixth embodiment. Referring first to FIG. 26, the sixth embodiment of the optical imaging lens 10 of the invention is substantially similar to the first embodiment, and the difference between the two is that the optical data, the aspheric coefficients, and the parameters of the lens elements 1, 2, 3, 4, 5, and 6 are slightly different. It should be mentioned here that, to clearly show the drawing, in FIG. 26, the reference numerals of the optical axis region and the periphery region with the same shape as the first embodiment are omitted.

The detailed optical data of the optical imaging lens 10 is as shown in FIG. 28. The effective focal length of the whole optical imaging lens 10 of the sixth embodiment is 1.502 mm, the HFOV is 61.020°, the Fno is 2.4, the system length is 5.231 mm, and the image height is 2.520 mm.

FIG. 29 shows each aspheric coefficient of the object-side surfaces 15, 25, 35, 45, 55, and 65 and the image-side surfaces 16, 26, 36, 46, 56, and 66 in formula (1) of the sixth embodiment.

Moreover, the relationship among the important parameters in the optical imaging lens 10 of the sixth embodiment is as shown in FIG. 36 and FIG. 37.

Figures 27A, 27B, 27C, 27D:
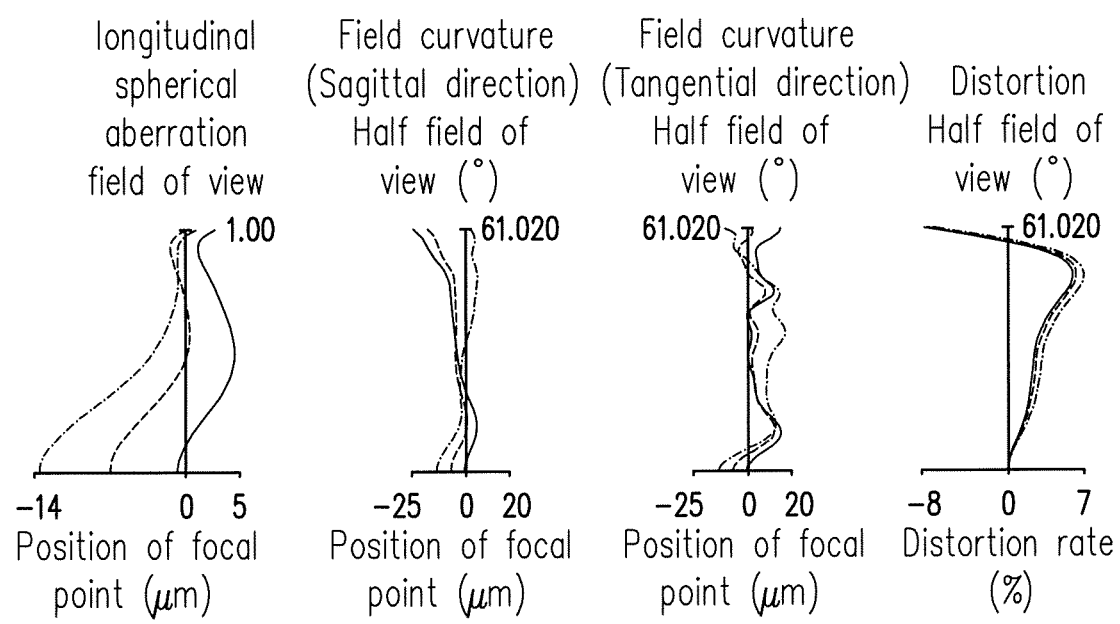
FIG. 27A to FIG. 27D are diagrams of a longitudinal spherical aberration and various aberrations of the optical imaging lens of the sixth embodiment.

In FIG. 27A which shows the longitudinal spherical aberration of the sixth embodiment in which the pupil radius is 0.3128 mm, the imaging point deviation of the off-axis rays at different heights is controlled within a range of ±13.5 microns. In FIG. 27B and FIG. 27C which illustrate two diagrams of the field curvature aberration, the focal length variation of the three representative wavelengths in the entire field of view is within a range of ±25 microns. In FIG. 27D, the distortion aberration shows that the distortion aberration of the sixth embodiment is maintained within a range of ±8%. Accordingly, in comparison to the existing optical lens, in the sixth embodiment, good imaging quality can still be provided under the condition of the system length reduced to about 5.231 mm.

It can be known from the above that, advantages of the sixth embodiment in comparison to the first embodiment are that the half field of view of the sixth embodiment is greater than the half field of view of the first embodiment, the longitudinal spherical aberration of the sixth embodiment is less than the longitudinal spherical aberration of the first embodiment, and the distortion aberration of the sixth embodiment is less than the distortion aberration of the first embodiment.

Figure 30:
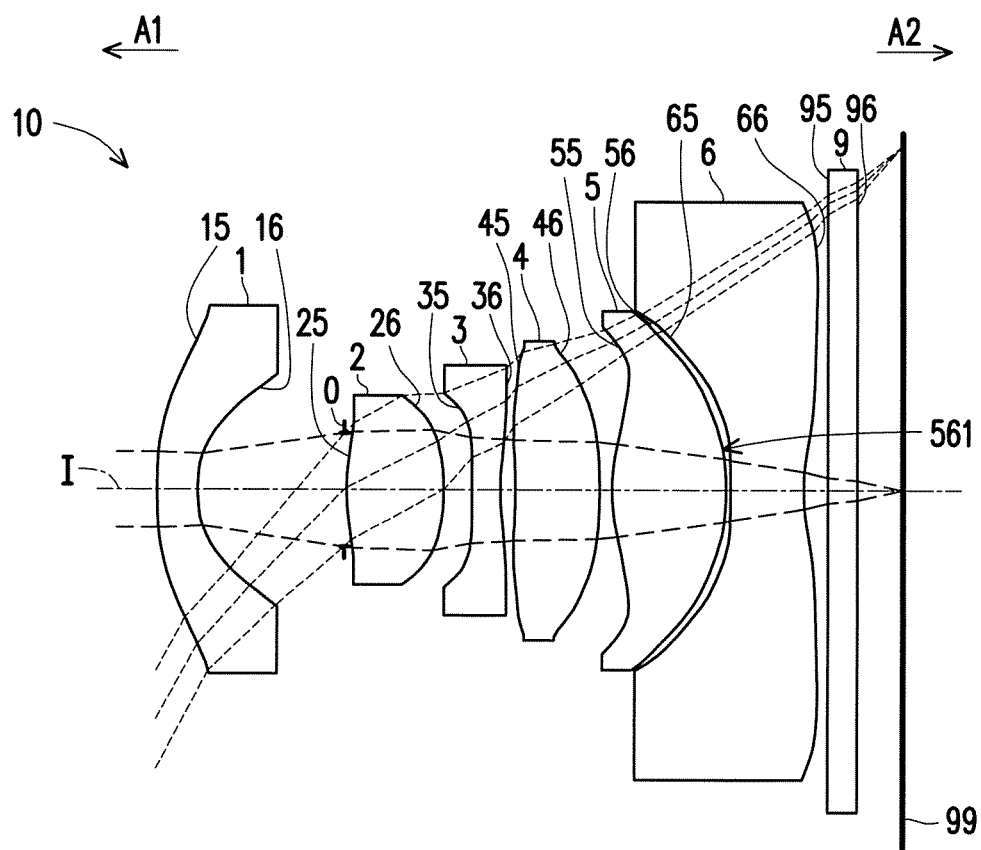
FIG. 30 is a schematic view of an optical imaging lens of a seventh embodiment of the invention.

FIG. 30 is a schematic view of an optical imaging lens of a seventh embodiment of the invention, and FIG. 31A to FIG. 31D are diagrams of the longitudinal spherical aberration and various aberrations of the optical imaging lens of the seventh embodiment. Referring first to FIG. 30, the seventh embodiment of the optical imaging lens 10 of the invention is substantially similar to the first embodiment, and the difference between the two is that the optical data, the aspheric coefficients, and the parameters of the lens elements 1, 2, 3, 4, 5, and 6 are slightly different. Moreover, in the present embodiment, an optical axis region 561 of the image-side surface 56 of the fifth lens element 5 is convex. It should be mentioned here that, to clearly show the drawing, in FIG. 30, the reference numerals of the optical axis region and the periphery region with the same shape as the first embodiment are omitted.

The detailed optical data of the optical imaging lens 10 is as shown in FIG. 32. The effective focal length of the whole optical imaging lens 10 of the seventh embodiment is 1.355 mm, the HFOV is 62.140°, the Fno is 2.4, the system length is 5.434 mm, and the image height is 2.520 mm.

FIG. 33 shows each aspheric coefficient of the object-side surfaces 15, 25, 35, 45, 55, and 65 and the image-side surfaces 16, 26, 36, 46, 56, and 66 in formula (1) of the seventh embodiment.

Moreover, the relationship among the important parameters in the optical imaging lens 10 of the seventh embodiment is as shown in FIG. 36 and FIG. 37.

Figures 31A, 31B, 31C, 31D:
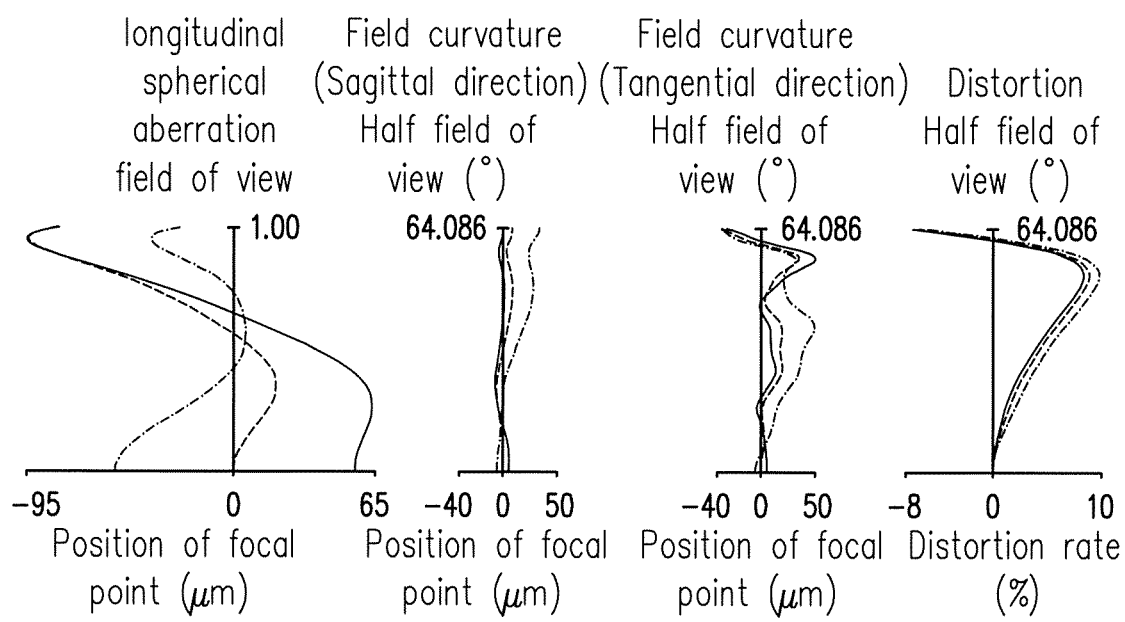
FIG. 31A to FIG. 31D are diagrams of a longitudinal spherical aberration and various aberrations of the optical imaging lens of the seventh embodiment.

In FIG. 31A which shows the longitudinal spherical aberration of the seventh embodiment in which the pupil radius is 0.2822 mm, the imaging point deviation of the off-axis rays at different heights is controlled within a range of ±95 microns. In FIG. 31B and FIG. 31C which illustrate two diagrams of the field curvature aberration, the focal length variation of the three representative wavelengths in the entire field of view is within a range of ±50 microns. In FIG. 31D, the distortion aberration shows that the distortion aberration of the seventh embodiment is maintained within the range of ±10%. Accordingly, in comparison to the existing optical lens, in the seventh embodiment, good imaging quality can still be provided under the condition of the system length reduced to about 5.434 mm.

It can be known from the above that, advantage of the seventh embodiment in comparison to the first embodiment are that the half field of view of the seventh embodiment is greater than the half field of view of the first embodiment, and the distortion aberration of the seventh embodiment is less than the distortion aberration of the first embodiment.

FIG. 34 to FIG. 37 are tables of each of the optical parameters of the seven embodiments above. In particular, the units for the numerical values from the row T1 to the row AAG in FIG. 34 and FIG. 36 are all millimeter (mm). Through the arrangement of the following designs operated with one another, the lens length can be effectively reduced, imaging quality can be ensured, the clarity of the overall and partial imaging of the object can be strengthened, and field of view can be increased: the periphery region 263 of the image-side surface 26 of the second lens element 2 is convex; the optical axis region 362 of the image-side surface 36 of the third lens element 3 is concave; the periphery region 554 of the object-side surface 55 of the fifth lens element 5 is concave; and the optical axis region 662 of the image-side surface 66 of the sixth lens element 6 is concave. Further, with the design: the optical axis region 251 of the object-side surface 25 of the second lens element 2 is convex, or the periphery region 354 of the object-side surface 35 of the third lens element 3 is concave. Such designs facilitate to correct the aberration of the optical imaging lens 10. Moreover, the optical imaging lens 10 satisfies TTL/EFL≥2.700, which facilitates to expand the field of view of the optical imaging system 10, and a preferable range is 2.700≤TTL/EFL≤4.100.

To achieve reduced system length of lens, in the embodiments of the invention, the thickness of the lens element and the air gap between the lens elements are suitably reduced. However, in consideration of the difficulty of the lens element assembly process and the need to ensure imaging quality, the thicknesses of the lens elements and the air gaps among the lens elements need to be adjusted together, or the ratios of the combinations of specific optical parameters in specific lens elements need to be adjusted. Therefore, given that the numeral limitations in the following conditional expressions are satisfied, the optical imaging system can achieve better configuration:

$AAG/(G12+G45) \leq 2.000$, a preferable range is $1.000 \leq AAG/(G12+G45) \leq 2.000$;

$ALT/(G56+T6) \geq 5.000$, a preferable range is $5.000 \leq ALT/(G56+T6) \leq 9.000$;

$(T2+T4)/G12 \leq 2.500$, a preferable range is $1.100 \leq (T2+T4)/G12 \leq 2.500$;

$(T4+T5)/T1 \geq 3.500$, a preferable range is $3.500 \leq (T4+T5)/T1 \leq 6.700$;

$TL/BFL \geq 4.300$, a preferable range is $4.300 \leq TL/BFL \leq 8.000$;

$(G12+G34)/(G23+G45) \geq 3.900$, a preferable range is $3.900 \leq (G12+G34)/(G23+G45) \leq 6.500$;

$T5/T6 \geq 1.500$, a preferable range is $1.500 \leq T5/T6 \leq 2.500$;

$EFL/(T1+T3) \geq 2.300$, a preferable range is $2.300 \leq EFL/(T1+T3) \leq 4.200$;

$ALT/(T1+T6) \geq 3.800$, a preferable range is $3.800 \leq ALT/(T1+T6) \leq 5.800$;

$AAG/(G23+G34) \geq 3.500$, a preferable range is $3.500 \leq AAG/(G23+G34) \leq 5.500$;

$ALT/(T5+G56) \geq 3.600$, a preferable range is $3.600 \leq ALT/(T5+G56) \leq 5.700$;

$(T1+T2)/T6 \leq 3.800$, a preferable range is $1.700 \leq (T1+T2)/T6 \leq 3.800$;

$T2/(G34+G45) \geq 2.000$, a preferable range is $2.000 \leq T2/(G34+G45) \leq 5.000$;

$EFL/G12 \leq 2.100$, a preferable range is $1.100 \leq EFL/G12 \leq 2.100$;

$(G12+T2)/T5 \leq 3.800$, a preferable range is $2.000 \leq (G12+T2)/T5 \leq 3.800$;

$T4/(G34+G56) \geq 2.300$, a preferable range is $2.300 \leq T4/(G34+G56) \leq 5.200$;

$G12/T1 \geq 2.500$, a preferable range is $2.500 \leq G12/T1 \leq 5.700$;

$TL/(T2+T3+T4) \leq 3.100$, a preferable range is $2.000 \leq TU(T2+T3+T4) \leq 3.100$.

However, due on the unpredictability of the optical system design, under the designs of the embodiments of the invention, by satisfying the above conditional expressions above, in the embodiments of the invention, lens length is reduced, f-number is reduced, field of view is increased, imaging quality is increased, or assembly yield is increased such that the drawbacks of the prior art are reduced.

Based on the above, the optical imaging lens 10 of an embodiment of the invention can achieve the following efficacies and advantages.

1. The longitudinal spherical aberration, field curvature aberration, and distortion of each of the embodiments of the invention all satisfy usage criteria. Moreover, the off-axis rays of different heights of the three representative wavelengths of 470 nm, 555 nm, and 650 nm are all concentrated near the imaging points, and it can be seen from the deflection margin of each curve that deviations of the imaging points of the off-axis rays of different heights can be all controlled to achieve a good capability to suppress spherical aberration, aberrations, and distortion aberration. Referring further to the imaging quality data, the distances among the three representative wavelengths of 470 nm, 555 nm, and 650 nm are also relatively close, indicating that the concentration of rays with different wavelengths and under various states in the embodiments of the invention is good, and excellent capability of dispersion suppression is achieved, and therefore it can be known from the above that the embodiments of the invention have good optical performance. The optical imaging lens 10 of the embodiment of the invention can be used as an imaging lens for visible light, and it can be known from the above that the optical imaging lens 10 has good imaging effect for visible light.

2. Moreover, the exemplary restrictive relationship formulas can also be combined in varying quantities for the embodiments of the invention, and are not limited thereto.

3. The numeral value ranges within the maximum and minimum values obtained from the combination ratio relationships of the optical parameters disclosed in each embodiment of the invention can all be implemented accordingly.

It will be apparent to those skilled in the art that various modifications and variations can be made to the structure of the invention without departing from the scope or spirit of the invention. In view of the foregoing, it is intended that the invention covers modifications and variations of this invention provided they fall within the scope of the following claims and their equivalents.

What is claimed is:

1. An optical imaging lens comprising a first lens element, a second lens element, a third lens element, a fourth lens element, a fifth lens element, and a sixth lens element from an object side to an image side in order along an optical axis, wherein the first lens element to the sixth lens element each comprise an object-side surface facing the object side and allowing imaging rays to pass through and an image-side surface facing the image side and allowing the imaging rays to pass through;

wherein, an optical axis region of the object-side surface of the first lens element is convex, and a periphery region of the image-side surface of the first lens element is concave;

a periphery region of the object-side surface of the second lens element is convex;

an optical axis region of the image-side surface of the third lens element is concave;

the fifth lens element has positive refracting power, and an optical axis region of the object-side surface of the fifth lens element is convex;

lens elements of the optical imaging lens are only the first lens element, the second lens element, the third lens element, the fourth lens element, the fifth lens element, and the sixth lens element, and the optical imaging lens satisfies the following expressions:

EFL/(T1+T3)≥2.300, and (G12+T2)/T5≤3.800 wherein EFL is an effective focal length of the optical imaging lens, T1 is a thickness of the first lens element along the optical axis, T2 is a thickness of the second lens element along the optical axis, T3 is a thickness of the third lens element along the optical axis, T5 is a thickness of the fifth lens element along the optical axis, and G12 is an air gap between the first lens element and the second lens element along the optical axis.

2. The optical imaging lens of claim 1, wherein the optical imaging lens further satisfies (T1+T2)/T6≤3.800, wherein T6 is a thickness of the sixth lens element along the optical axis.

3. The optical imaging lens of claim 1, wherein the thickness of the fifth lens element along the optical axis is greater than a thickness of the sixth lens element along the optical axis.

4. The optical imaging lens of claim 1, wherein the thickness of the first lens element along the optical axis is greater than an air gap between the second lens element and the third lens element along the optical axis.

5. The optical imaging lens of claim 1, wherein the thickness of the fifth lens element along the optical axis is greater than an air gap between the fourth lens element and the fifth lens element along the optical axis.

6. The optical imaging lens of claim 1, wherein a thickness of the sixth lens element along the optical axis is greater than an air gap between the fourth lens element and the fifth lens element along the optical axis.

7. An optical imaging lens comprising a first lens element, a second lens element, a third lens element, a fourth lens element, a fifth lens element, and a sixth lens element from an object side to an image side in order along an optical axis, wherein the first lens element to the sixth lens element each comprise an object-side surface facing the object side and allowing imaging rays to pass through and an image-side surface facing the image side and allowing the imaging rays to pass through;

wherein, a periphery region of the image-side surface of the third lens element is concave;

an optical axis region of the object-side surface of the fifth lens element is convex, and an optical axis region of the image-side surface of the fifth lens element is concave;

the sixth lens element has negative refracting power, and an optical axis region of the image-side surface of the sixth lens element is concave;

lens elements of the optical imaging lens are only the first lens element, the second lens element, the third lens element, the fourth lens element, the fifth lens element, and the sixth lens element, and the optical imaging lens satisfies the following expressions:

EFL/(T1+T3)≥2.300 and (G12+T2)/T5≤3.800, wherein EFL is an effective focal length of the optical imaging lens, T1 is a thickness of the first lens element along the optical axis, T2 is a thickness of the second lens element along the optical axis, T3 is a thickness of the third lens element along the optical axis, T5 is a thickness of the fifth lens element along the optical axis, and G12 is an air gap between the first lens element and the second lens element along the optical axis.

8. The optical imaging lens of claim 7, wherein the optical imaging lens further satisfies AAG/(G12+G45)≤2.000, wherein AAG is a sum of five air gaps among the first lens element to the sixth lens element along the optical axis, and G45 is an air gap between the fourth lens element and the fifth lens element along the optical axis.

9. The optical imaging lens of claim 7, wherein the optical imaging lens further satisfies ALT/(T5+G56)≥3.600, wherein ALT is a sum of thicknesses of six lens elements including the first lens element through the sixth lens element along the optical axis and G56 is an air gap between the fifth lens element and the sixth lens element along the optical axis.

10. The optical imaging lens of claim 7, wherein the optical imaging lens further satisfies T4/(G34+G56)≥2.300, wherein T4 is a thickness of the fourth lens element along the optical axis, and G34 is an air gap between the third lens element and the fourth lens element along the optical axis, and G56 is an air gap between the fifth lens element and the sixth lens element along the optical axis.

11. The optical imaging lens of claim 7, wherein the thickness of the first lens element along the optical axis is greater than an air gap between the third lens element and the fourth lens element along the optical axis.

12. The optical imaging lens of claim 7, wherein the thickness of the first lens element along the optical axis is greater than an air gap between the fourth lens element and the fifth lens element along the optical axis.

13. An optical imaging lens comprising a first lens element, a second lens element, a third lens element, a fourth lens element, a fifth lens element, and a sixth lens element from an object side to an image side in order along an optical axis, wherein the first lens element to the sixth lens element each comprise an object-side surface facing the object side and allowing imaging rays to pass through and an image-side surface facing the image side and allowing the imaging rays to pass through;

wherein, the third lens element has negative refracting power, and a periphery region of the image-side surface of the third lens element is concave;

the sixth lens element has negative refracting power;

a thickness of the first lens element along the optical axis is greater than an air gap between the third lens element through the fourth lens element along the optical axis;

lens elements of the optical imaging lens are only the first lens element, the second lens element, the third lens element, the fourth lens element, the fifth lens element, and the sixth lens element, and the optical imaging lens satisfies the following expressions:

$$EFL/(T1+T3) \geq 2.300, (G12+T2)/T5 \leq 3.800 TL/BFL \geq 4.300,$$

wherein EFL is an effective focal length of the optical imaging lens, T1 is the thickness of the first lens element along the optical axis, T2 is a thickness of the second lens element along the optical axis, T3 is a thickness of the third lens element along the optical axis, T5 is a thickness of the fifth lens element along the optical axis, G12 is an air gap between the first lens element and the second lens element along the optical axis, TL is a distance from the object-side surface of the first lens element to the image-side surface of the sixth lens element along the optical axis, and BFL is a distance from the image-side surface of the sixth lens element to an image plane along the optical axis.

14. The optical imaging lens of claim 13, wherein the optical imaging lens further satisfies $T5/T6 \geq 1.500$, wherein T6 is a thickness of the sixth lens element along the optical axis.

15. The optical imaging lens of claim 14, wherein the optical imaging lens further satisfies $ALT/(T1+T6) \geq 3.800$, wherein ALT is a sum of thicknesses of six lens elements including the first lens element through the sixth lens element along the optical axis, and T6 is a thickness of the sixth lens element along the optical axis.

16. The optical imaging lens of claim 13, wherein the thickness of the second lens element along the optical axis is greater than an air gap between the fourth lens element through the fifth lens element along the optical axis.

17. The optical imaging lens of claim 13, wherein the thickness of the third lens element along the optical axis is greater than an air gap between the fourth lens element through the fifth lens element along the optical axis.

18. The optical imaging lens of claim 13, wherein a thickness of the fourth lens element along the optical axis is greater than an air gap between the fourth lens element through the fifth lens element along the optical axis.

* * * * *